United States Patent [19]

Watanabe et al.

[11] Patent Number: 5,403,245

[45] Date of Patent: Apr. 4, 1995

[54] CONTROL DEVICE FOR VEHICULAR ENGINE HAVING AN AUTOMATIC TRANSMISSION AND ITS CONTROL METHOD

[75] Inventors: Shinji Watanabe; Ryoji Nishiyama; Kohji Hasunaka; Hideaki Katashiba; Hitoshi Inoue, all of Amagasaki, Japan

[73] Assignee: Mitsubishi Denki Kabushiki Kaisha, Tokyo, Japan

[21] Appl. No.: 52,677

[22] Filed: Apr. 27, 1993

[30] Foreign Application Priority Data

May 28, 1992 [JP] Japan ................................ 4-136844
Jul. 3, 1992 [JP] Japan ................................ 4-176890
Oct. 23, 1992 [JP] Japan ................................ 4-286320

[51] Int. Cl.⁶ ...................... B60K 41/04; F16H 59/26
[52] U.S. Cl. ................................ 477/54; 477/102; 477/107
[58] Field of Search .................. 477/37, 38, 50, 54, 477/102, 107, 110; 123/350, 425, 435

[56] References Cited

U.S. PATENT DOCUMENTS

| | | | |
|---|---|---|---|
| 4,896,642 | 1/1990 | Washino et al. | 123/435 |
| 4,903,665 | 2/1990 | Washino et al. | 123/435 |
| 5,036,728 | 8/1991 | Kawasoe et al. | 477/54 |
| 5,048,372 | 9/1991 | Sodeno et al. | 477/102 |
| 5,101,788 | 4/1992 | Demizu et al. | 123/425 |

FOREIGN PATENT DOCUMENTS 2204677 8/1990 Japan.
3-79859 4/1991 Japan.

*Primary Examiner*—John J. Vrablik
*Attorney, Agent, or Firm*—Sughrue, Mion, Zinn, Macpeak & Seas

[57] ABSTRACT

A control device for a vehicular engine having an automatic transmission comprising: an inner cylinder pressure sensor for detecting a pressure in a combustion chamber of an engine; means for detecting an output of the inner cylinder pressure sensor at a predetermined crank angle; means for calculating an output torque of the engine based on the detected output of the inner cylinder pressure sensor; means for detecting a rotation speed of an engine; means for detecting a rotation speed of an output shaft of a torque convertor; means for calculating a speed ratio of the rotation speed of the output shaft of the torque converter as compared to the rotation speed of the engine; means for calculating a torque of an output shaft of an automatic transmission based on the output torque of the engine, the rotation speed of the engine, the rotation speed of the output shaft of the torque converter and the speed ratio; and control means for controlling at least one of the output torque of the engine and a hydraulic pressure of the automatic transmission such that the torque of the output shaft of the automatic transmission conforms to a target torque.

1 Claim, 17 Drawing Sheets

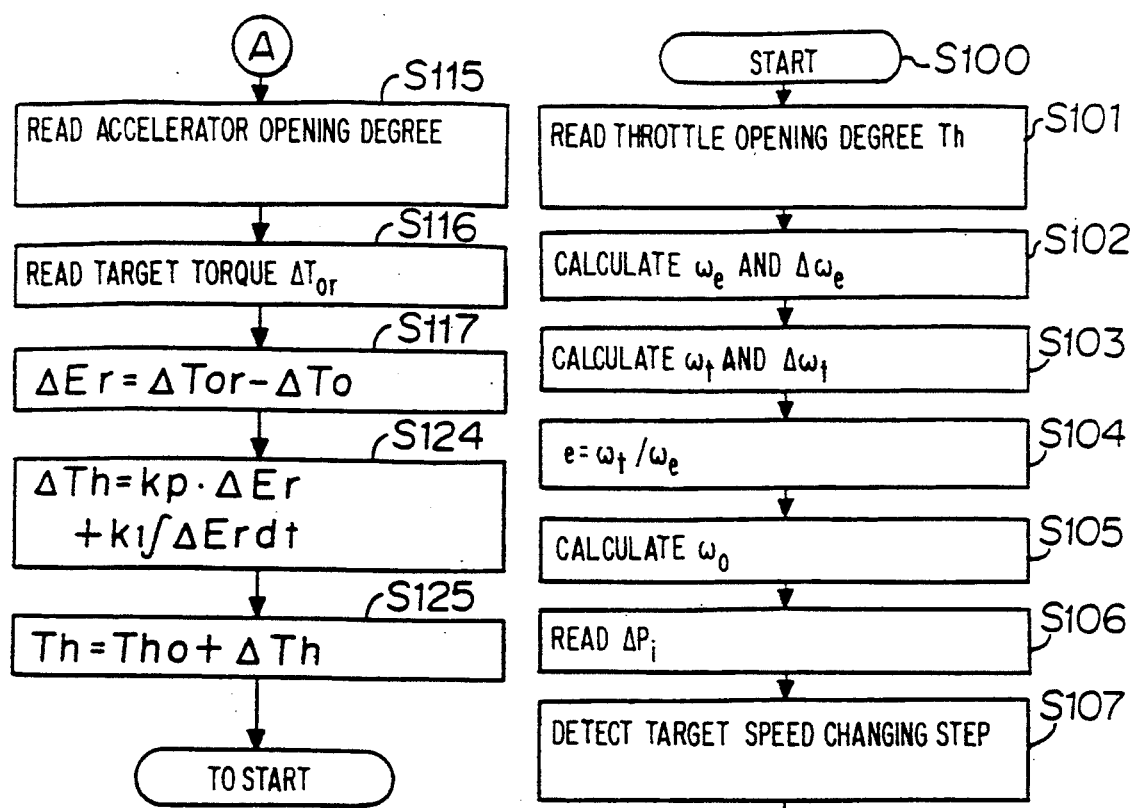
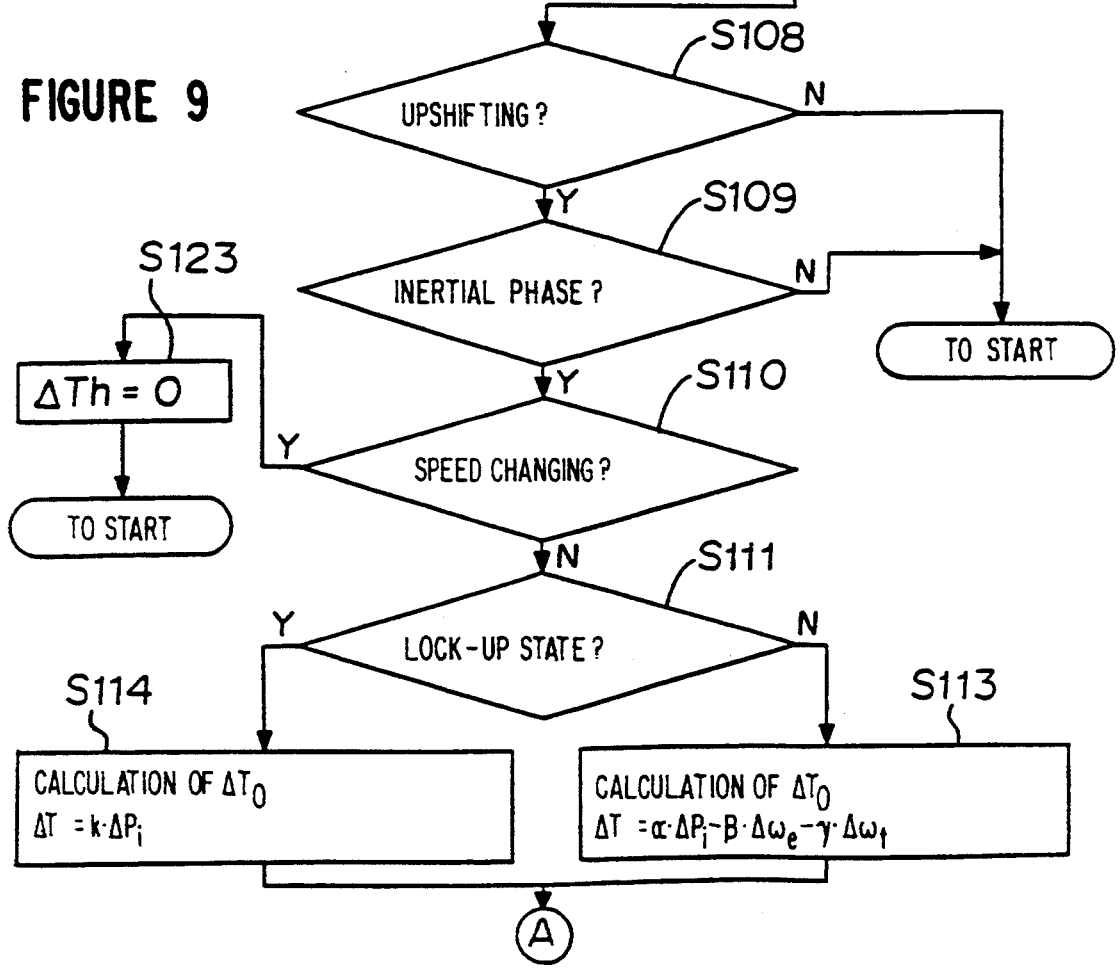
FIGURE 9

CONTROL DEVICE FOR VEHICULAR ENGINE HAVING AN AUTOMATIC TRANSMISSION AND ITS CONTROL METHOD

BACKGROUND OF THE INVENTION

1. Field of the Invention

This invention relates to a control device for a vehicular engine having an automatic transmission and its control method for controlling an output of an engine when a speed is changed by an automatic transmission in a vehicle having the automatic transmission.

2. Discussion of Background

FIG. 19 shows the construction of a conventional control device for a vehicular engine having an automatic transmission, which is disclosed, for instance, in Japanese Examined Patent Publication No. 20164/1991, wherein a reciprocating piston 23 is inserted into an engine main body 1 and a combustion chamber 24 is formed above the piston 23. An intake pipe 10 and an exhaust pipe 13 are respectively connected to the combustion chamber 24. A throttle valve 12 is provided upstream of the intake pipe 10. An injector 11 is provided downstream of the intake pipe 10 such that the injector 11 protrudes into the intake pipe 10.

Furthermore, although not described in the publication, in addition to these, an intake air quality sensor or a boost pressure sensor for detecting an inner passage pressure of the intake pipe 10 may be provided upstream of the throttle valve 12. An ignition plug 15 is disposed in the combustion chamber 24 such that the ignition plug 15 protrudes in the combustion chamber 24. Furthermore, a crank angle sensor 18 for detecting an engine crank angle and an intake stroke TDC is provided at the crank shaft 31 connected to the piston 23 and rotating cooperatingly therewith.

The throttle valve 12 is connected with a throttle opening degree sensor 19, a servomotor 19b for driving the throttle valve 12 and a servomotor driving circuit 19a for driving the servomotor 19b. An accelerator opening degree sensor 101 for detecting an operating quantity of an accelerator pedal, that is, an accelerator opening degree, is provided to the accelerator pedal, not shown. A stroke sensor 102 is provided to a car body for detecting a sinking quantity of a suspension, not shown, for the purpose of detecting a car weight.

On the other hand, an automatic transmission 4 is provided with a gear position sensor 64 for detecting speed changing steps of a gear changing unit 43, a rotation speed sensor 62 for detecting a rotation speed of an output shaft of a torque converter 3, a vehicle speed sensor 63 for detecting a vehicle speed from a rotation number of a driving shaft, not shown, and a hydraulic control unit 5a for switching operational combination of a plurality of hydraulic friction elements 42 provided in the automatic transmission 4 for conforming the gear changing unit 43 to speed changing steps in accordance with the running state of a car.

An electronic control unit (ECU) 6 receives detecting signals from sensors for detecting various running conditions of the engine, for instance, detecting signals from an intake quantity sensor, the throttle opening degree sensor 19, the crank angle sensor 18 and the like, or a speed changing signal of the automatic transmission 4 or the like, controls starting of fuel injection and a valve opening time of the injector 11 in accordance with a previously memorized program, and controls current flowing timing and a current flowing time of discharge energy to the ignition plug 15 through the ignition coil 16. The ECU 6 controls the intake quantity by controlling the throttle opening degree through the servomotor 19b such that the output torque of the engine can be provided in accordance with an operating quantity of the accelerator pedal. The ECU 6 performs the speed changing control by outputting a control signal for switching the operational combination of the hydraulic friction elements to a new combination in accordance with the speed changing step, to the hydraulic control unit 5a such that the speed changing step of the gear changing unit 43 of the automatic transmission 4 is optimized in accordance with a vehicle velocity provided by a vehicle velocity sensor 63 and the above running conditions of the engine.

The ECU 6 is composed of a CPU, a ROM, a RAM, an A/D converter having a multiplexer, an I/O interface circuit, a common bus connecting these and the like. The CPU calculates a fuel injection quantity based on the data detected by the various sensors in accordance with a program memorized in the ROM, and outputs a pulse signal based on the calculated fuel injection quantity to the injector 11 through a driving circuit in the I/O interface circuit. At this occasion, the fuel injection quantity $TAU_0$ is determined based on the following equation (1).

$$TAU_0 = TP \cdot FAF \cdot K + TV \tag{1}$$

where TP designates a basic injection quantity determined by a ratio $A/N = Q_a/N_e$ of the intake quantity $Q_a$ as compared to the rotation speed $N_e$ of the engine, FAF, an air-fuel ratio correction coefficient, K, other correction coefficient and TV, an ineffective injection time due to the operational delay of the injector 11. Furthermore, the ignition time $SA_0$ is calculated by a table look-up of an advance angle map which is previously determined by the rotation speed $N_e$ of the engine and the A/N value. The ignition timing and the current flowing time are controlled through the ignition signal driving circuit in the I/O interface circuit based on the calculated value.

Furthermore, the ECU 6 predicts by calculation a target engine torque $T_{er}$ by the following equation (2), in accordance with the signals from the various sensor for detecting the various running conditions of the engine.

$$T_{er} = K_1 \cdot a - K_2 \cdot N_e \tag{2}$$

where $K_1$ and $K_2$ designate parameters for determining a characteristic of the output torque of the engine, wherein $K_1$ is a proportional coefficient of the output torque of the engine with regards to the accelerator opening degree "a" and $K_2$, a proportional coefficient of the output torque with regards to the rotation speed $N_e$ of the engine, which are respectively calculated by the following equation (3).

$$K_1 = C_1 \cdot W/m, \quad K_2 = C_2 \cdot W/m^2 \tag{3}$$

where m designates a gear ratio (speed reducing ratio) of the gear changing device 43, $C_1$ and $C_2$, constants which are previously obtained by experiments or the like and which provide the best driving feeling of the vehicle and W, vehicle weight provided by the following equation.

$$W = W_0 + x/k_s \qquad (4)$$

where $W_0$ designates a previously-known weight of only the car body, x, an output of the stroke sensor 102 which is a sinking quantity of the suspension caused by the weight of passengers or a mounted load and $K_s$, a spring constant of suspension.

Furthermore, the target throttle opening degree which provides the intake quantity necessary for outputting the target engine torque $T_{er}$, is read from a throttle opening degree table by the rotational speed $N_e$ of the engine and the target engine torque $T_{er}$, which is outputted to the servomotor driving circuit 19a. The servomotor driving circuit 19a drives the servomotor 19a positively and negatively in accordance with a deviation between the actual throttle opening degree detected by the throttle opening degree sensor 19 and the target throttle opening degree, and controls the intake quantity such that the opening degree of the throttle valve 12 follows the target value, thereby controlling the engine to the target torque $T_{er}$.

The ECU 6 calculates a speed ratio e $(=N_t/N_E)$ of a torque converter from a speed ratio of the rotation speed $N_t$ of an output shaft of the torque converter as compared to the rotation speed $N_E$ of the engine, reads a torque ratio f of the torque converter from a predetermined torque ratio map as a function of the speed ratio e of the torque converter, and calculates the torque $T_t$ of the output shaft of the torque converter from the torque ratio f and the target engine torque $T_{er}$ based on the following equation (5).

$$T_t = f \cdot T_{er} \qquad (5)$$

Furthermore, the ECU 6 reads a target speed changing step from a predetermined shift pattern schedule table by the vehicle speed $V_{sp}$ detected by the vehicle speed sensor 63 and the torque $T_t$ of the output shaft of the torque converter, and performs the speed changing control wherein the operational combination of the hydraulic friction engaging elements is switched by outputting a control signal of an ON-OFF logic in accordance with the target speed changing step, to a shift solenoid valve in the hydraulic control unit 5a of the automatic transmission 4 such that the gear speed changing unit 43 is shifted from a current speed changing step to the target speed changing step.

As other conventional technology, hydraulic wet clutches or brakes employed in the automatic transmission which conventionally achieves plural steps of gear changing ratios by a selective combination of a plurality of gears, performs engaging and disengaging of the transmission torque by supply and discharge of a hydraulic pressure called line pressure.

Generally, this line pressure is controlled by regulating a spool opening degree by a set pressure and a feedback pressure in the axial direction of a pressure regulating valve employing a spool valve, and is set in accordance with the speed changing step and the output of the engine, for instance, increase of the throttle opening degree.

Furthermore, setting the line pressure based on a pulse width of fuel injection of the engine, has already been considered, which is shown, for instance, in Japanese Unexamined Patent Publication No. 116363/1989. In this conventional example, the pulse width of fuel injection is regarded as approximately proportional to the output torque of the engine, and based on a predicted value of the engine torque, the line pressure of the automatic transmission is regulated.

In the conventional control device for a vehicular engine having an automatic transmission, the output torque of the engine is not detected and the torque $T_t$ of the output shaft of the automatic transmission 4 which is the target in the speed changing operation, is indirectly predicted by calculation from the accelerator opening degree "a" and the rotation speed $N_E$ of the engine. In the speed changing operation, the hydraulic pressure control is not performed in accordance with the torque $T_t$ of the output shaft of the automatic transmission 4. Accordingly, a speed changing shock may be caused by variations, timewise changes or the like of the engine or the hydraulic characteristics of the automatic transmission 4, which brings about a disagreeable feeling to a driver and a favorable shift quality is not provided.

In the line pressure control device in the conventional control apparatus for a vehicular engine, having an automatic transmission, the engine output is predicted without directly detecting the engine torque, the input torque of the automatic transmission is calculated based on an average characteristic of the torque converter, a torque quantity considering a safety factor against a rapid load variation is regarded as the input torque for the automatic transmission, and the line pressure necessary for the torque transmission is calculated by a predetermined method, for instance, a map-look-up, thereby determining the line pressure.

Accordingly, the actually necessitated line pressure is previously determined to a higher value so that disadvantage by, for instance, an excessive slip of the hydraulic wet clutches and brakes, is not caused by individual difference, aging and the like of the engine. Therefore, a driving loss of a pump of the automatic transmission increases, which causes to deteriorate a fuel cost of the engine.

Furthermore, in the conventional example wherein the engine torque is predicted by employing the pulse width of the fuel injection, the accuracy of predicting the torque is deteriorated when the combustion efficiency of the engine changes by the change of the intake quantity or by a warming-up state of the engine, and as a result, the accuracy of controlling the line pressure is deteriorated.

SUMMARY OF THE INVENTION

It is an object of the present invention to solve the above problems and to provide a control device for a vehicular engine having an automatic transmission capable of predicting the torque of the output shaft and controlling the output torque of the engine, the hydraulic pressure of the automatic transmission and the like based on the torque of the output shaft, thereby achieving a good shift quality.

It is an object of the present invention to provide a control device for a vehicular engine having an automatic transmission capable of preventing the deterioration of the fuel cost of the engine caused by the excessive pumping work.

Furthermore, it is an object of the present invention to provide a method for controlling a vehicular engine having an automatic transmission capable of minimizing the power loss of the engine with respect to the working fluid which is always applied to the automatic transmission, irrespective of the aging of the engine.

According to a first aspect of the present invention, there is provided a control device for a vehicular engine having an automatic transmission comprising:
- an inner cylinder pressure sensor for detecting a pressure in a combustion chamber of an engine;
- means for detecting an output of the inner cylinder pressure sensor at a predetermined crank angle;
- means for calculating an output torque of the engine based on the detected output of the inner cylinder pressure sensor;
- means for detecting a rotation speed of an engine;
- means for detecting a rotation speed of an output shaft of a torque convertor;
- means for calculating a speed ratio of the rotation speed of the output shaft of the torque converter as compared to the rotation speed of the engine;
- means for calculating a torque of an output shaft of an automatic transmission based on the output torque of the engine, the rotation speed of the engine, the rotation speed of the output shaft of the torque converter and the speed ratio; and
- control means for controlling at least one of the output torque of the engine and a hydraulic pressure of the automatic transmission such that the torque of the output shaft of the automatic transmission conforms to a target torque.

According to a second aspect of the present invention, there is provided a control device for a vehicular engine having an automatic transmission comprising:
- an inner cylinder pressure sensor for detecting a pressure in a combustion chamber of an engine;
- means for setting a line pressure of a working fluid for supplying to an automatic transmission;
- means for detecting a rotation speed of the engine;
- torque predicting means for calculating an output torque of the engine based on a detected value provided by detecting an output of the inner cylinder pressure sensor at a predetermined angle, for calculating a speed ratio of a rotation speed of an output shaft of a torque converter as compared to the rotation speed of the engine and for predicting a torque of an input shaft of the automatic transmission by calculating the torque of the input shaft of the automatic transmission based on the output torque of the engine, the rotation speed of the engine, the rotation speed of the output shaft of the torque converter and the speed ratio; and
- hydraulic pressure controlling means for controlling the line pressure of the working fluid for supplying to the automatic transmission based on the torque of the input shaft of the automatic transmission predicted by the torque predicting means.

According to a third aspect of the present invention, there is provided a control method for a vehicular engine having an automatic transmission comprising the steps of:
- detecting a pressure in a combustion chamber of an engine by an inner cylinder pressure sensor;
- calculating an output torque of the engine based on a detected value provided by detecting the pressure in the combustion chamber at a predetermined crank angle;
- setting a line pressure of a working fluid for supplying to an automatic transmission;
- detecting a rotation speed of the engine;
- calculating a speed ratio of a rotation speed of an output shaft of a torque converter as compared to the rotation speed of the engine;
- detecting a speed changing ratio of the automatic transmission;
- predicting a torque of an input shaft of the automatic transmission by calculating the torque of the input shaft of the automatic transmission based on the output torque of the engine, the rotation speed of the engine, the rotation speed of the output shaft of the torque converter and the speed ratio; and
- controlling the line pressure of the working fluid for supplying to the automatic transmission by calculating a target line pressure based on the predicted torque of the input shaft of the automatic transmission.

In the control device for a vehicular engine having an automatic transmission of the first aspect of the present invention, the output torque of the engine is calculated, the torque of the output shaft of the automatic transmission is calculated from the output torque of the engine, the rotation speed of the engine and the rotation speed of the output shaft of the torque converter, and at least one of the ignition timing, the fuel injection quantity, the throttle opening degree and the hydraulic pressure of the automatic transmission, is controlled such that the torque of the output shaft conforms to the target torque.

In the control device for a vehicular engine having an automatic transmission of the second aspect of the present invention, the pressure in the combustion chamber of the engine is detected by the inner cylinder pressure sensor, the output of the inner cylinder pressure sensor is detected at the predetermined crank angle, and the control means calculates the torque of the engine and calculates the speed ratio of the torque converter from the ratio of the rotation speed of the output shaft of the torque converter as compared to the rotation speed of the engine.

Furthermore, the control means predicts the torque of the input shaft of the automatic transmission from the speed changing ratio of the automatic transmission, the output torque of the engine, the rotation speed of the engine, the rotation speed of the output shaft of the torque converter and the speed ratio of the torque converter. Based on the predicted value, the line pressure of the working fluid supplied to the automatic transmission is controlled by the hydraulic pressure controlling means.

In the control method for a vehicular engine having an automatic transmission of the third aspect of the present invention, the pressure in the combustion engine of the engine is detected at the predetermined crank angle, the output torque of the engine is calculated based on the detected value, the speed ratio of the rotation speed of the engine as compared to the rotation speed of the output shaft of the torque converter, is calculated, and the torque of the input shaft of the automatic transmission is predicted by calculating the torque of the input shaft of the automatic transmission from the output torque of the engine, the rotation speed of the engine, the rotation speed of the output shaft of the torque converter and the speed ratio. Based on the predicted value, the line pressure of the working fluid supplied to the automatic transmission is controlled.

BRIEF DESCRIPTION OF THE DRAWINGS

FIG. 9 is a main flowchart for explaining the operation of an embodiment 3 of this invention;

DETAILED DESCRIPTION OF THE PREFERRED EMBODIMENTS

EXAMPLE 1

Figure 1:
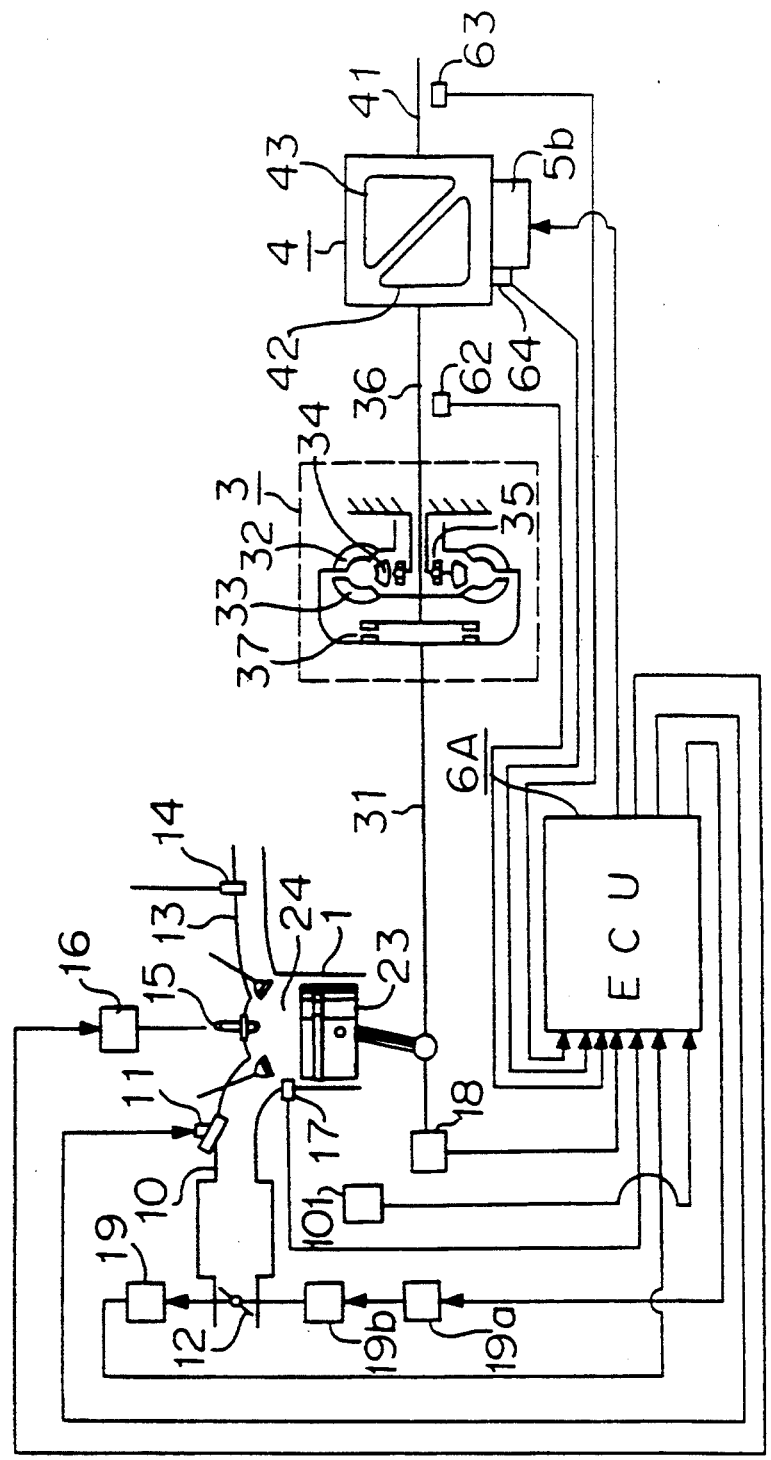
FIG. 1 is a block diagram showing the construction of an embodiment 1 of this invention of a control device for a vehicular engine having an automatic transmission.
Figure 19:
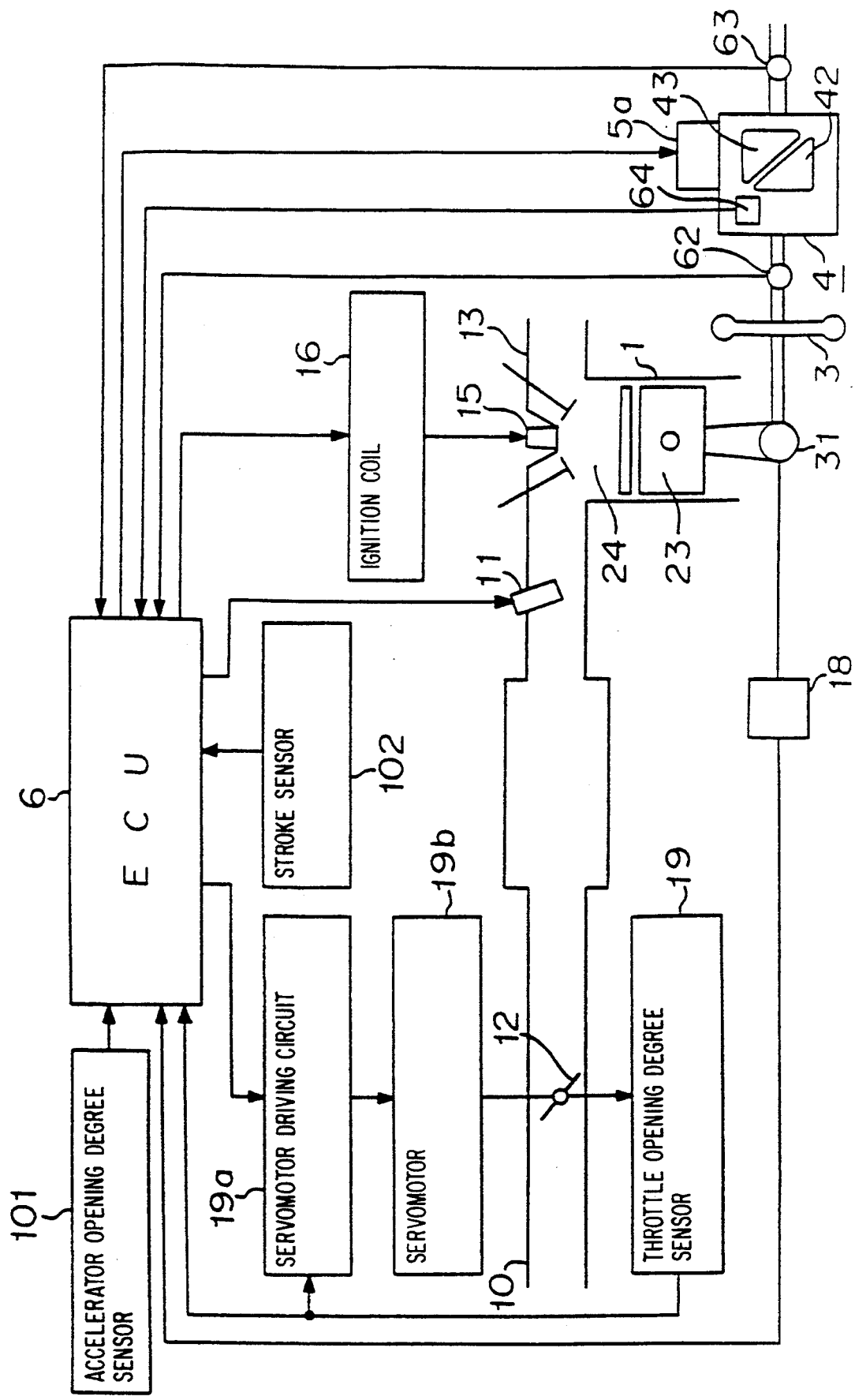
FIG. 19 is a block diagram showing the construction of a conventional control device for a vehicular engine having an automatic transmission.

A explanation will be given of an embodiment 1 of this invention in reference to the drawings as follows. FIG. 1 is a block diagram showing the construction of the embodiment of this invention of a control device for a vehicular engine having an automatic transmission. In FIG. 1, a notation the same with that in FIG. 19 designates the same or the corresponding portion. The torque converter 3 is provided with a pump 32, a turbine liner 33, a stator 34 and a one-way clutch 35, wherein the stator 34 is connected to a casing of the automatic transmission 4 through the one-way clutch 35, and rotates in a direction the same with that of the input shaft (the crank shaft of the engine) 31 by the function of the one-way clutch 35. However, the rotation thereof to the reverse direction is not allowable. A lock-up clutch 37 is provided between the input shaft 31 and the turbine liner 33 connected to an output shaft 36, which operates in a steady-state running mainly at high speed steps, and locks up the input shaft 31 and the output shaft 36 thereby promoting the transmission efficiency. Accordingly, the output of the engine main body 1 is transmitted to the turbine liner 33 by the lock-up clutch 37 or by rotating the inner working fluid by the pump 32, while increasing the torque under a counter-force by the stator 34. The torque transmitted to the turbine liner 33 is transmitted to the gear changing unit 43 through the output shaft (the input shaft of the automatic transmission 4) 36 of the torque converter 3. A reference numeral 14 designates an air-fuel ratio sensor, 17, an inner cylinder pressure sensor, 41, an output shaft, 42, the hydraulic friction engaging elements and 5b, the hydraulic pressure control unit.

Figure 4:
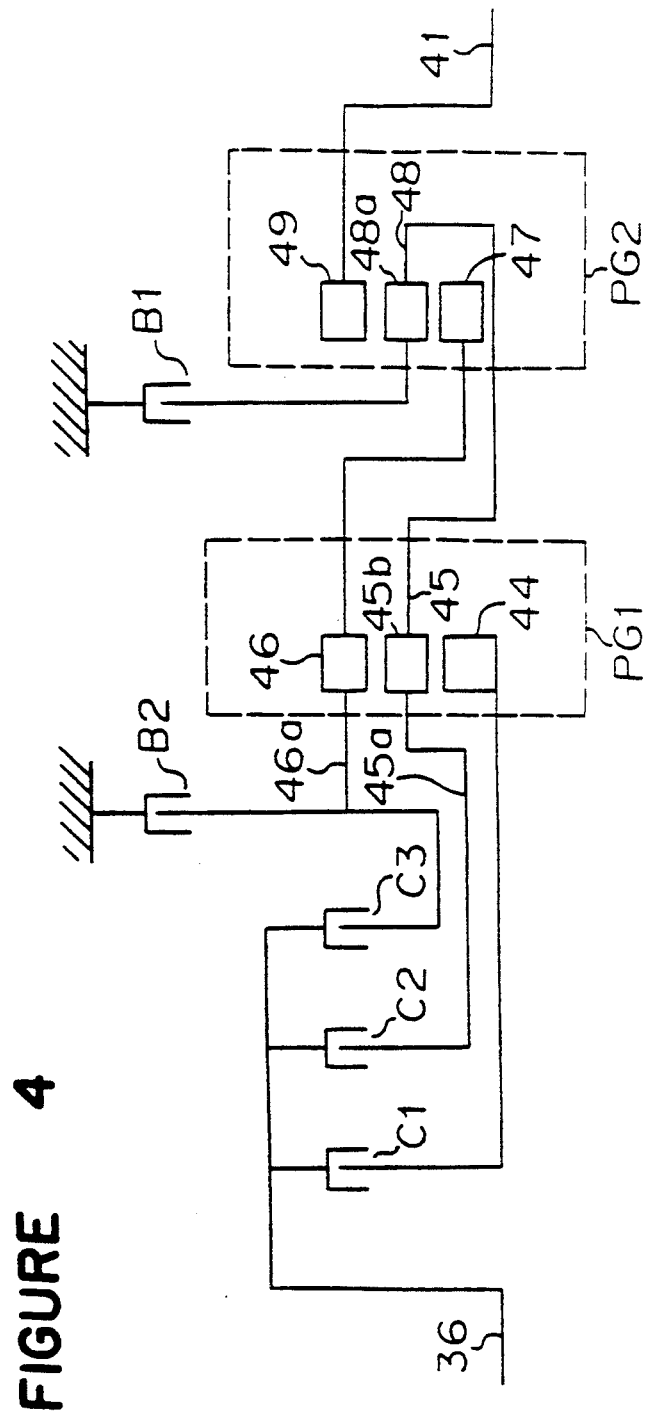
FIG. 4 is a construction diagram of a gear changing unit of an automatic transmission 4 in FIG. 1.

FIG. 4 is a conceptual diagram of the gear changing unit 43 capable of achieving the speed changing steps of forward 4 steps and reverse 1 step. The output shaft 36 is connected to an underdrive clutch (hereinafter UD clutch) C1, overdrive clutch (OD clutch) C2 and a reverse clutch (R clutch) C3 as the hydraulic friction engaging elements 42. The output side of the OD clutch C2 is connected to a first carrier 45 of a first simple planetary gear unit (hereinafter, first gear unit) PG1 through an intermediate shaft 45a, to a second carrier 48 of a second simple planetary gear unit (hereinafter, a second gear unit) PG2, and to a low reverse brake B1 as a hydraulic friction engaging element for stopping the rotation of the first intermediate shaft 45a.

Furthermore, the output side of the UD clutch C1 is connected to a first sun gear 44 of the first gear unit PG1. The output side of an R clutch C3 is connected to a first ring gear 46 of the first gear unit PG1 through a second intermediate shaft 46a, to a second sun gear 47 of the second gear unit PG2 and to 2-4 brake B2 as a hydraulic friction engaging element for stopping the rotation of the second intermediate shaft 46a.

The first gear unit PG1 is composed of the first sun gear 44, a first pinion gear 45b meshed with the first sun gear 44, the rotatable first carrier 45 which rotatably supports the first pinion gear 45b and the first ring gear 46 meshed with the first pinion gear 45b. The second gear unit PG2 is composed of the second sun gear 47, a second pinion gear 48a meshed with the second sun gear 47, the rotatable second carrier 48 which rotatably supports the second pinion gear 48a and the second ring gear 49 meshed with the second pinion gear 48a. The second ring gear 49 is connected to the output shaft 41 of the gear speed changing unit 43.

The respective clutches C1 through C3 and the brakes B1 and B2 are provided with engaging piston devices or servo devices or the like, which perform engaging or disengaging operation by supplying and discharging hydraulic pressure. This hydraulic pressure is selectively supplied from the hydraulic pressure controlling unit 5b, and the speed changing steps of forward 4 steps and reverse 1 step are achieved by the operational combination of the clutches C1 through C3 and the brakes B1 and B2. Table 1 shows the operational state of the respective clutches C1 through C3 and the brakes B1 and B2 in the respective speed changing steps, wherein "◯" mark designates the engaging of the clutch or the brake, whereas "—" mark designates the disengaging thereof.

TABLE 1

| Hydraulic friction engaging element | Speed changing step | | | | |
|---|---|---|---|---|---|
| | First speed | Second speed | Third speed | Fourth speed | Reverse |
| Low reverse brake | O | — | — | — | O |
| 2-4 brake | — | O | — | O | — |
| UD clutch | O | O | O | — | — |
| OD clutch | — | — | O | O | — |
| R clutch | — | — | — | — | O |

In the above construction, when the low reverse brake B1 is engaged, the respective carriers 45 and 48 are fixed and become counter-force elements, and by engaging the UD clutch C1, the driving force from the torque converter 3 is transmitted to the output shaft 41 through the input shaft 36, the UD clutch C1, the first sun gear 44, the first pinion gear 45b, the first ring gear 46, the second sun gear 47, the second pinion gear 48a and the second ring gear 49, thereby achieving the first speed.

Next, when the low reverse brake B1 is disengaged and the 2-4 brake B2 is engaged while maintaining the engaging state of the UD clutch C1, the rotations of the first ring gear 46 and the second sun gear 47 are stopped, which become the counter-force elements, the driving force of the torque converter 3 is transmitted to the output shaft 41 through the first sun gear 44, the first carrier 45, the second carrier 48 and the second ring gear 49, thereby achieving the second speed.

Next, when the 2-4 brake B2 is disengaged and the OD clutch C2 is engaged while maintaining the engaging state of the UD clutch C1, all the first gear unit PG1 integrally rotates since the first sun gear 44 and the first carrier 45 rotate integrally and, therefore, the second gear unit PG2 similarly rotates integrally, and the input shaft 36 and the output shaft 41 share the same rotation speed, thereby achieving the third speed.

Next, when the UD clutch C1 is disengaged and the 2-4 brake B2 is engaged while maintaining the engaging state of the OD clutch C2, the rotation of the second sun gear 47 is stopped which becomes the counter-force element, and the driving force of the torque converter 3 is transmitted to the output shaft 41 through the input shaft 36, the OD clutch C2, the first intermediate shaft 45a, the first carrier 45, the second carrier 48, the second pinion gear 48a and the second ring gear 49, thereby achieving the fourth speed of overdrive wherein the rotation of the output shaft 41 is faster than the rotation of the input shaft 36.

Next, when the OD clutch C2 and the 2-4 brake B2 are disengaged and the low reverse brake B1 is engaged, the first and second carriers 45 and 48 are fixed and become counter-force elements, and the driving force is transmitted to the output shaft 41 by engaging the R clutch C3, through the second intermediate shaft 46a, the first ring gear 46, the second sun gear 47, the second pinion gear 48a and the second ring gear 49, thereby achieving the reverse speed changing step.

Figure 5:
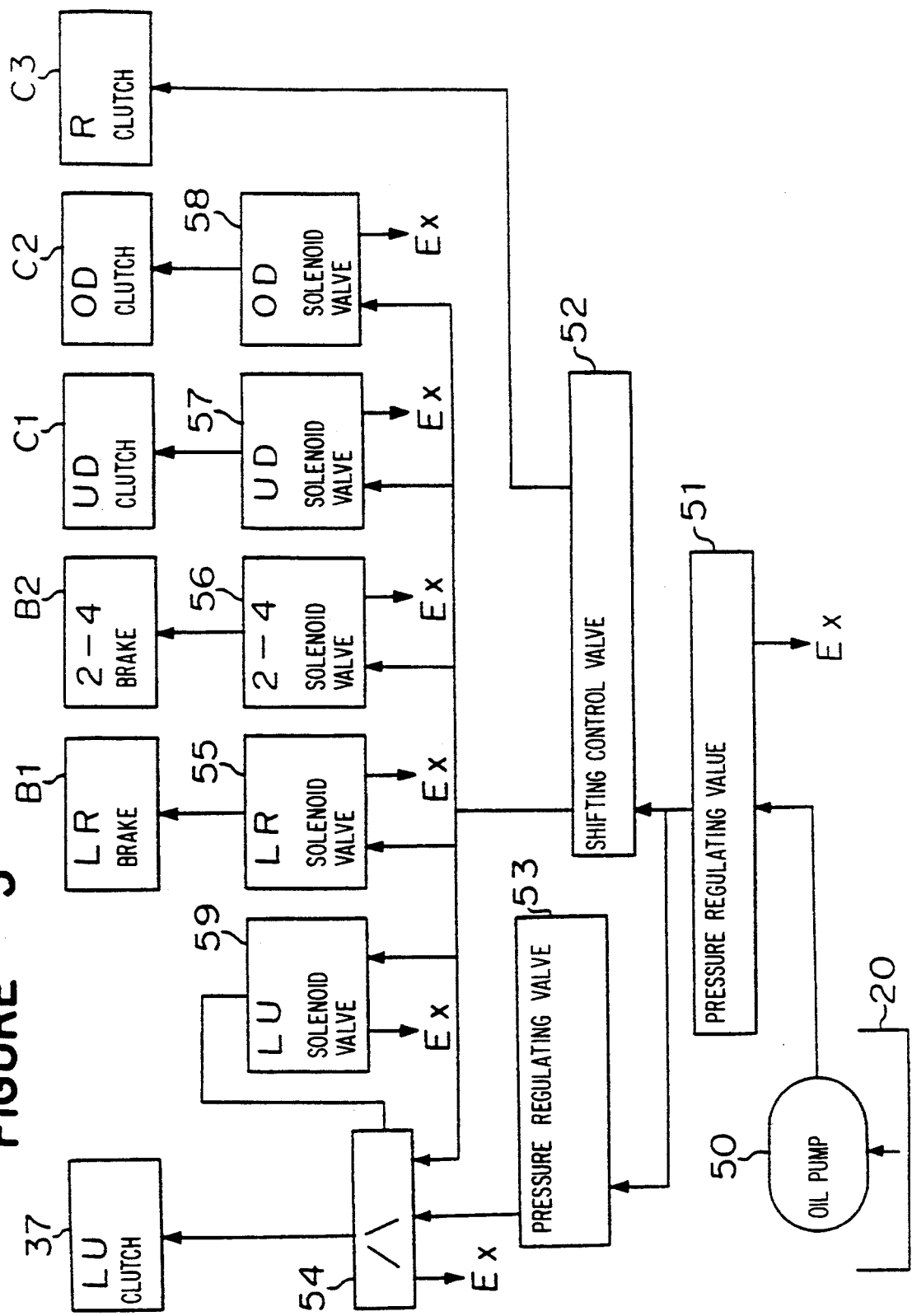
FIG. 5 is a construction diagram of a hydraulic pressure controlling unit of the automatic transmission 4 in FIG. 1.

Next, an explanation will be given of the construction and the operation of the hydraulic pressure controlling units 5b for achieving the respective speed changing steps shown in Table 1 in the gear speed changing unit 43 of FIG. 4. FIG. 5 shows the construction of the hydraulic pressure controlling unit 5b, wherein the hydraulic pressure generated by an oil pump 50 disposed on the crank shaft 31 of the engine and which is driven by the engine 1, is controlled to a constant pressure as a line pressure by a pressure regulating valve 51. A reference numeral 20 designates an oil pan.

The controlled line pressure is supplied to a shifting control valve 52 which is operated by directly connecting to a shift lever, not shown, oil passages are selectively switched in accordance with the position of the shift lever, the supply of the hydraulic pressure to the clutches C1 to C3 and the brakes B1 and B2 which engage in the forward and the reverse steps, is performed through respective solenoid valves 55 through 58 or directly. Furthermore, the controlled line pressure is supplied to a torque converter control valve 54 through a pressure regulating valve 53 for the torque converter 3, which controls the torque converter control valve 54 indirectly by a lock-up solenoid valve 59 and engages or disengages the lock-up clutch 37 by controlling the hydraulic pressure of the lock-up clutch 37.

The construction and the operation of the solenoid valves 55 through 59 for controlling the hydraulic pressure, is publicly-known in "An analysis on the characteristic of a duty-control solenoid valve for converting electricity to hydraulic pressure", Transaction of the Automobile Engineering Society 1988, Vol. 42, No. 4, P. 517 through 523, wherein the hydraulic pressure control is performed by respectively duty-controlling the solenoid valves 55 through 59 in engaging and disengaging the respective clutches and brakes. That is to say, the hydraulic pressure in switching the respective clutches and brakes accompanied by transition from a speed changing step to another speed changing step is controlled by employing the solenoid valves 55 through 59. For instance, when the power-on shifting from the first speed to the second speed is performed, the 2-4 brake B2 is engaged by increasing the hydraulic pressure thereof by the solenoid valve 56 and at the same time, the low reverse brake B1 is disengaged by lowering the hydraulic pressure thereof by the solenoid valve 55 in accordance the increase of the hydraulic pressure of the 2-4 brake B1.

Figure 2:
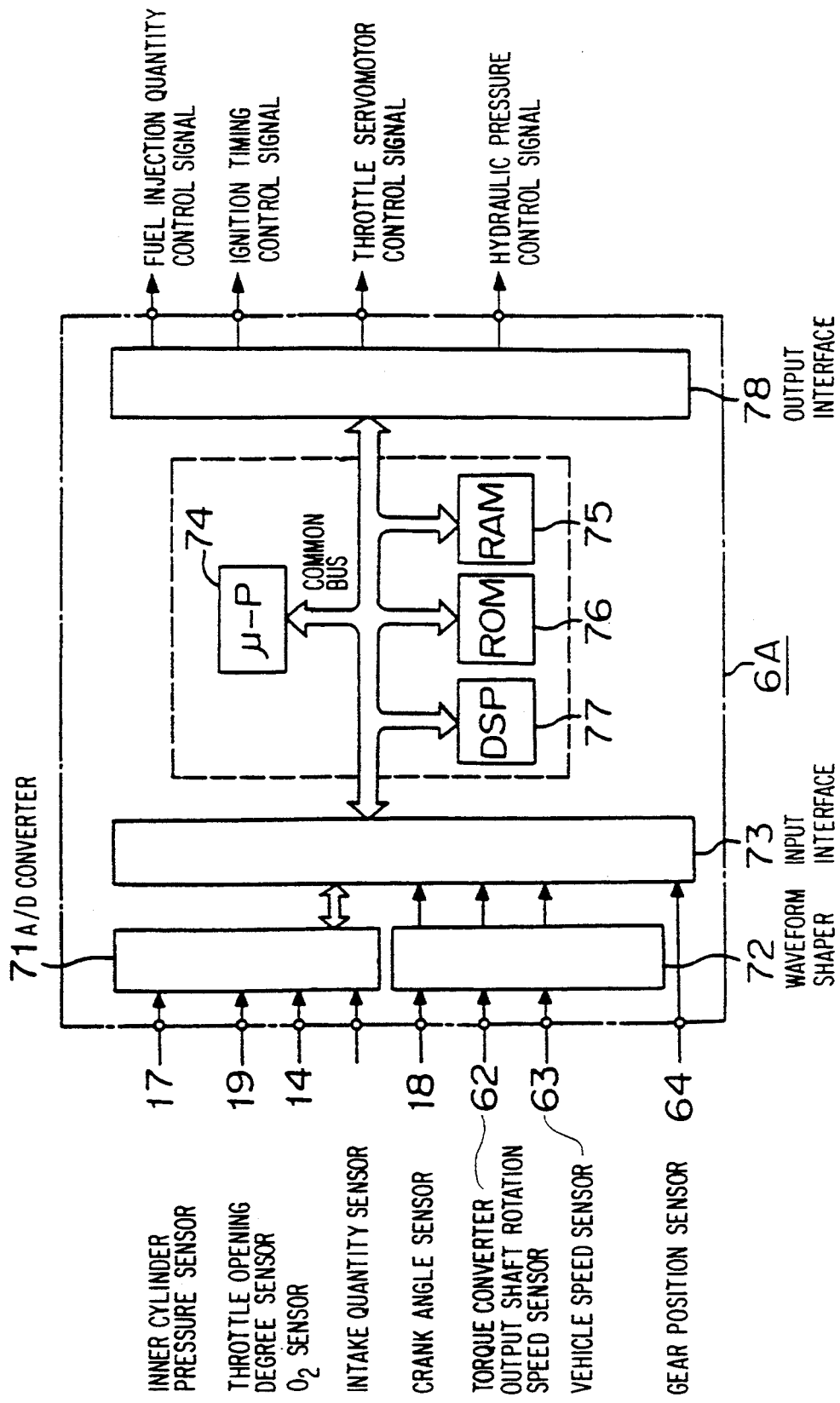
FIG. 2 is a block diagram showing the construction of an electronic control unit (ECU) in FIG. 1.

FIG. 2 shows an outline construction of the ECU 6A. The output signals of the inner cylinder pressure sensor 17 and the like are inputted into an input interface 73 through an A/D converter 71 and a waveform shaper 72. An input signal from a gear position sensor 64 is inputted to the input interface 73. The output of the input interface 73 is inputted to a microprocessor 74. The fuel quantity TAU, an ignition timing SA, a throttle opening degree Th and a hydraulic pressure setting value DU which are to be supplied to the engine main body 1 and the automatic transmission 4, are calculated. Following the calculation results, the ECU 6A outputs control signals to the injector 11, the ignition coil 16, the servomotor driving circuit 19b and the solenoid valves 55 through 59 in the hydraulic pressure controlling unit 5b, through an output interface 78.

The control procedure and the data of the microprocessor 74 are previously memorized in the ROM 76. The RAM 75 temporarily stores data in the calculation procedure. Furthermore, a digital signal processor (DSP) 77 calculates an output signal of the inner cylinder pressure sensor 17 at high speed in synchronism with the crank angle, and transmits the calculation result to the microprocessor 74 through the common bus.

Figure 3:
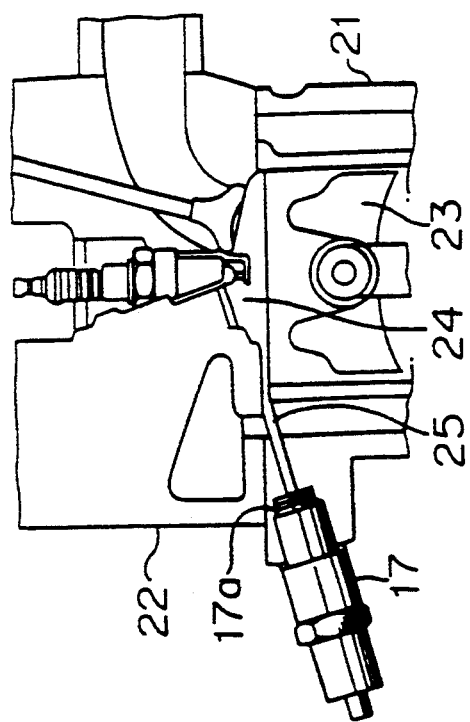
FIG. 3 is a diagram showing a mounting state of an inner cylinder pressure sensor 17 in a combustion chamber of FIG. 1.

FIG. 3 shows the inner cylinder pressure sensor 17 for detecting the pressure in the combustion chamber 24 and its mounting situation. A reference numeral 21 designates a cylinder block, 22, a cylinder head, 23, a piston, and 17, the inner cylinder pressure sensor having a pressure detecting unit 17a, which is attached to the cylinder block 21. A numeral 25 designates a pressure leading unit for leading the pressure from the combustion chamber 24 to the inner cylinder pressure sensor 17. The inner cylinder pressure sensor 17 outputs an inner cylinder pressure signal which is proportional to the pressure in the combustion chamber 24. The pressure detecting unit 17a exposed to the pressure leading unit 25, measures the pressure by a pressure transducing element through, for instance, silicon oil enclosed in a metallic diaphragm or the like. As the pressure transducing element, a semiconductor-type sensor which stands an elevated temperature (300° C.) and a high pressure (60 kg/cm$^2$), is employed. The semiconductor-type sensor employs a strain gage formed by injecting impurity such as boron on single crystal silicon formed on a silicon oxide, and measures the pressure applied to the silicon oil by converting the pressure to a strain quantity. A piezoelectric element may be employed as the inner cylinder pressure sensor 17.

Figure 6:
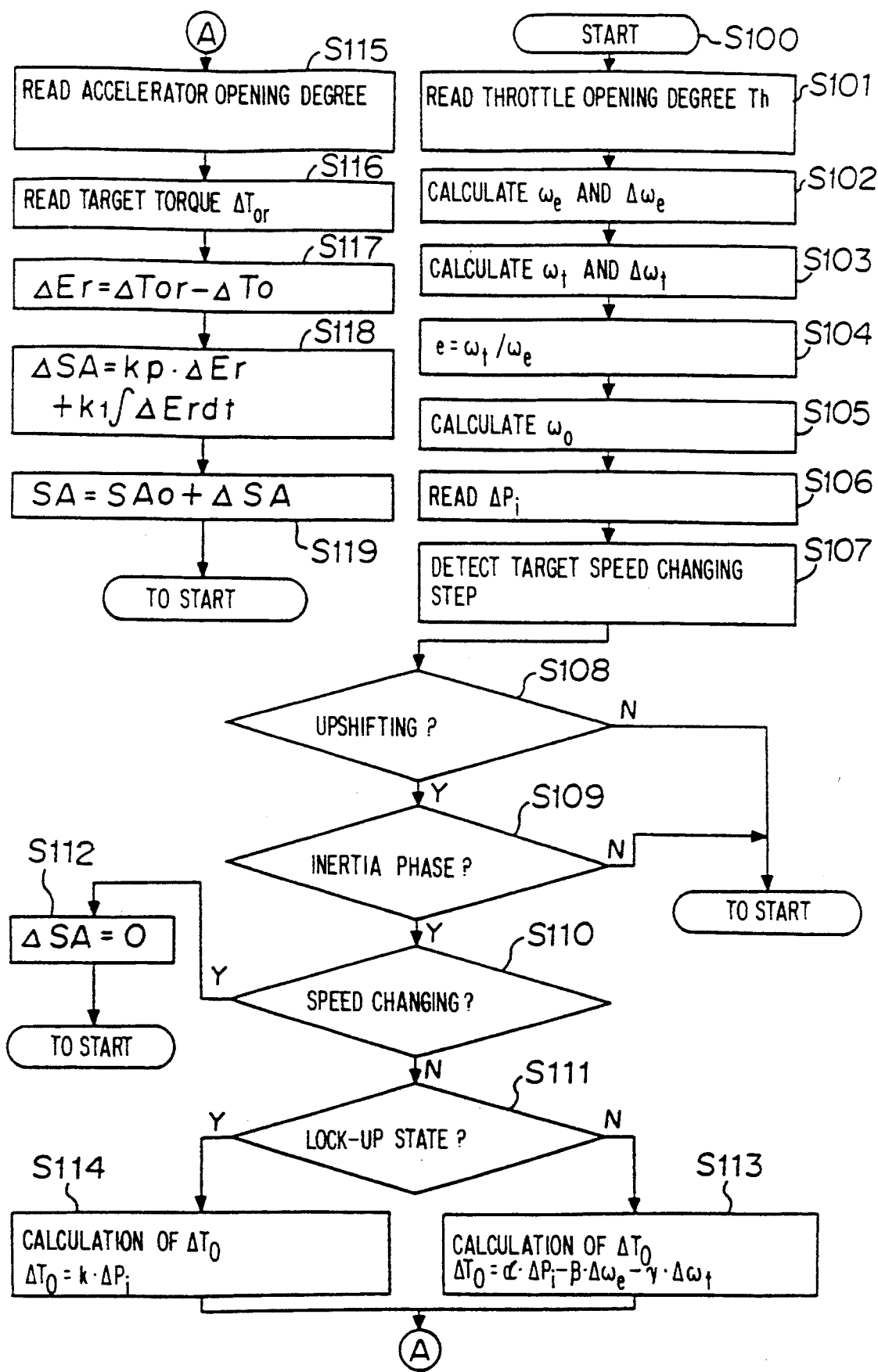
FIG. 6 is a main flowchart for explaining the operation of the embodiment 1 of this invention.
Figure 7:
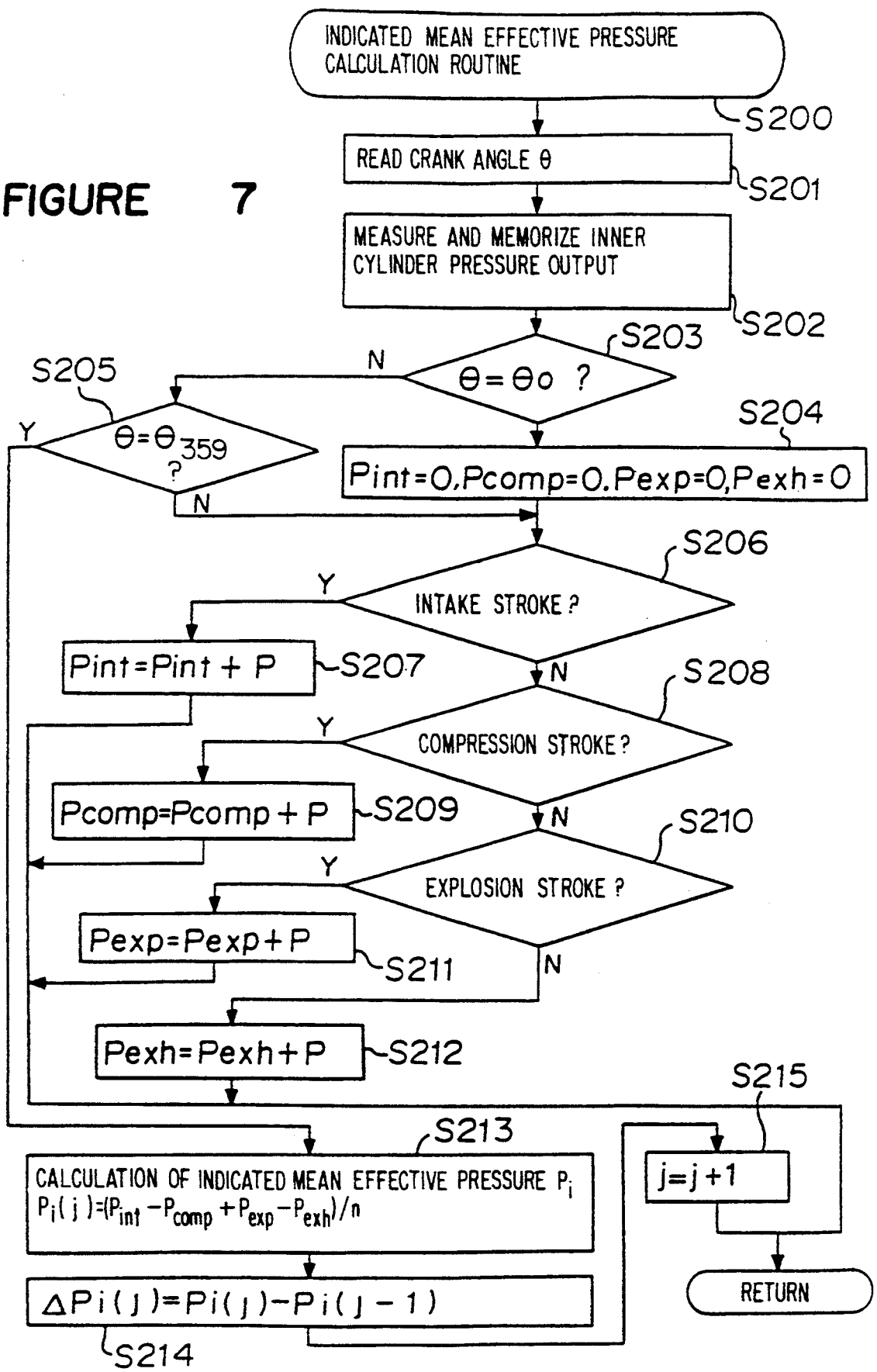
FIG. 7 is a flowchart for explaining the operation of a crank angle interruption routine of the embodiment 1 of this invention.

Next, an explanation will be given of the calculation procedure of the ECU 6 by employing flowcharts of FIGS. 6 and 7. A main routine shown in FIG. 6 is processed by the microprocessor 74 in the ECU 6, whereas an interruption routine synchronizing with the crank angle of FIG. 7 is processed by the DSP 77 in the ECU 6, of which calculation result is transmitted to the microprocessor 74 at predetermined timings. First, an explanation will be given of the operation of the main routine based on the flowchart of FIG. 6. The explanation will be given to a case of a single cylinder for simplicity. However, in case of multi-cylinders, a treatment is added which recognizes the respective cylinders based on the output signal of the crank angle sensor 18 and a treatment similar to the case of a single cylinder is performed for each of the cylinders.

The operation starts in Step S100. In Step S101, the operation reads the throttle opening degree $T_h$ from the output of the throttle opening degree sensor 19 and memorizes it in the RAM 75. In Step S102, the operation calculates the rotation speed $\omega_e$ and its change ratio $\Delta\omega_e$ based on the crank angle signal from the crank angle sensor 18 and memorizes them in the RAM 75. In Step S103, the operation calculates the rotation speed $\omega_t$ of the output shaft of the torque converter and its change ratio $\Delta\omega_t$ from the output of the rotation speed sensor 62 and memorizes them in the RAM 75.

In Step S104, the operation calculates a ratio $e=\omega_t/\omega_e$ of the rotation speed of the engine as compared to the rotation speed $\omega_t$ of the output shaft of the torque converter, and memorizes it in the RAM 75. In Step 105, the operation calculates a vehicle speed (rotation speed of the output shaft of the automatic transmission) $\omega_0$ and memorizes it in the RAM 75. In Step S106, the operation reads an indicated mean effective pressure $\Delta P_i$ which is a calculation result of the DSP 77 treated by a crank angle interruption routine to be mentioned later, from a RAM incorporated in the DSP 77, and memorizes it in the RAM 75.

In Step S107, the operation reads an output of the gear position sensor 64, detects a shift lever position (either one of forward, neutral and reverse modes of the automatic transmission 4 is selected by the operation of a driver) of the automatic transmission 4, reads a target speed changing step from a shift pattern schedule table which is previously provided with respect to the shift lever position, the throttle opening degree $T_h$ and the vehicle speed $\omega_0$, and memorizes the target speed changing step and a gear ratio $i_r$ in the RAM 75.

In Step S108, the operation reads the current speed changing step of the automatic transmission 4 (the speed changing step and the corresponding gear ratio $i_a$ when the preceding speed changing is finished, are memorized in the RAM 75) from the RAM 75, and determines whether the automatic transmission 4 is performing the upshifting by comparing the value with the target speed changing step detected in Step S107. When the upshifting is being performed, the operation proceeds to Step S109.

In Step S109, the operation determines whether the operation state of the automatic transmission 4 performing the upshifting is in an inertia phase. The inertia phase designates a state wherein the rotation speed $\omega_e$ of the engine and the rotation speed $\omega_t$ of the output shaft of the torque converter are not converged to the target revolution numbers when the speed changing is finished, by inertias of the engine and the automatic transmission 4, although a mechanical gear changing (switching of clutches) of the automatic transmission 4 is finished.

The generation of the inertia phase is already public-known by "RATIO CHANGING THE PASSENGER CAR AUTOMATIC TRANSMISSION" SAE Paper 311A 1961, which is a phenomenon particular to a stepped speed changer and which dominates the speed changing time. In Step S109, when a relationship of $\omega_t < i_a \cdot \omega_0$, is established between the speed of the input shaft and the output shaft of the automatic transmission 4 from the gear ratio $i_a$ of the current speed changing step, the vehicle speed $\omega_0$ and the rotation speed $\omega_t$ of the output shaft of the torque converter, the operation determines that the current speed changing state is in the inertia phase, and proceeds to Step S110. When the operation determines NO at either one of the Steps S108 and S109, the operation returns to START.

In Step S110, when a relationship of $\omega_t = i_r \cdot \omega_0$ is established between the speed of the input shaft and the output shaft of the automatic transmission 4, the operation determines that the speed changing is finished. In Step S110, when the operation determines NO, the operation determines whether the lock-up clutch 37 is in a lock-up state in Step S111.

When the operation determines YES in Step S110, the operation proceeds to S112, wherein the operation resets an ignition timing correction value $\Delta SA$ as 0, renews the target speed changing step and the gear ratio $i_r$ as the current speed changing step and the gear ratio $i_a$, memorizes them in the RAM 75, finishes the treatment of the main routine and returns to START.

In Step S111, the operation determines whether the torque converter is in a lock-up operating state by a lock-up operating region map of the torque converter 3 which is previously determined by the throttle opening degree $T_h$ and the rotation speed $\omega_t$ of the output shaft of the torque converter. When the operation determines that the torque converter is not in the lock-up operating state, the operation proceeds to Step S113. In Step S113, the operation reads coefficients $\alpha$, $\beta$ and $\gamma$ which are predetermined in accordance with the gear ratio $i_r$ and the speed ratio e from the ROM 76, and calculates and memorizes the torque $\Delta T_0$ of the output shaft of the automatic transmission 4 based on the following equation (6) by employing the indicated mean effective pressure $\Delta P_i$, the change ratio $\Delta\omega_e$ of the rotation speed of the engine and the change ratio $\Delta\omega_t$ of the rotation speed of the output shaft of the torque converter which are memorized in the RAM 75.

$$\Delta T_0 = \alpha \cdot \Delta P_i - \beta \cdot \Delta\omega_e - \gamma \cdot \Delta\omega_t \qquad (6)$$

The values of the coefficient $\alpha$, $\beta$ and $\gamma$ are, for instance, $\alpha=1.57$, $\beta=0.02$ and $\gamma=0.01$ in the upshifting from the first speed to the second speed in a mass-produced car mounted with a 3000 cc engine and a four-speed automatic transmission. The set values of $\beta$ and $\gamma$ may be changed in accordance with a range of the speed ratio e of the torque converter.

When the operation determines that the torque converter is in the lock-up operating state in S111, the operation proceeds to Step S114 and calculates and memorizes the torque $\Delta T_0$ of the output shaft by employing the following equation (7).

$$\Delta T_0 = k \cdot \Delta P_i \qquad (7)$$

where k is a coefficient corresponding to a mechanical connection state of shaft and gear from the engine to the automatic transmission 4 in the lock-up operating state, which is predetermined in accordance with the gear ratio $i_r$.

After calculating and memorizing the torque $\Delta T_0$ of the output shaft in Steps S113 and S114, the operation proceeds to S115, reads an accelerator pedal opening degree THA from an output of the accelerator pedal opening degree sensor 101 and memorizes it in the RAM 75. In Step S116, the operation reads a target torque $\Delta T_{or}$ which is predetermined with respect to the accelerator pedal opening degree THA and the vehicle speed $\omega_0$.

In Step S117, the operation calculates and memorizes an error $\Delta E_r = \Delta T_{or} - \Delta T_0$ from the target torque $\Delta T_{or}$ and the torque $\Delta T_0$ of the output shaft. In Step S118, the operation calculates and memorizes an ignition timing correction value $\Delta SA$ by the following equation (8).

$$\Delta SA = k_p \Delta E_r + k_1 \int \Delta E_r dt \qquad (8)$$

where $k_p$ is a proportional gain and $k_1$, an integral gain. In Step S119, the operation adds the ignition timing correction value $\Delta SA$ to a basic ignition timing $SA_0$, and finishes the main routine by calculating and memorizing the ignition timing SA.

In the above embodiment the operation calculates the ignition timing correction value $\Delta SA$ based on the proportional and the integral gains in Step S118. However, instead of this calculation, the operation may perform a fuzzy calculation inputted with the rotation speed $\omega_e$ of the engine and the torque error $\Delta E_r$.

Next, an explanation will be given of the crank angle interruption routine by FIG. 7. First, the operation reads a crank angle $\theta$ from the output of the crank angle sensor 18, in Step S201. In Step S202, the operation measures and memorizes the pressure signal of the inner cylinder pressure sensor 17 as the inner cylinder pressure value $P(\theta)$ at the crank angle $\theta$. In Step S203, the operation determines whether the crank angle $\theta$ is the intake TDC $\theta_0$. When the crank angle $\theta$ is $\theta_0$, the operation resets the respective values of inner cylinder pressure summations in the respective strokes of intake, compression, explosion and exhaust in Step S204, as $P_{int}=0$, $P_{comp}=0$, $P_{exp}=0$ and $P_{exh}=0$.

In Step S206, the operation determines whether the crank angle $\theta$ is in a range of $0 \leq \theta < 180$ setting the intake TDC at 0° CA, that is, the crank angle $\theta$ is in the intake stroke. When YES, the operation calculates and memorizes the inner pressure summation of the intake stroke $P_{int} = P_{int} + P$ in Step 207. When the crank angle $\theta$ is not in the intake stroke, the operation determines whether the crank angle $\theta$ is in the compression stroke in Step S208. When YES, the operation calculates and memorizes the inner pressure summation of the compression stroke $P_{comp} = P_{comp} + P$ in Step S209. Similarly, in Step S210, the operation determines whether the crank angle $\theta$ is in the explosion stroke. When YES, the operation calculates and memorizes the inner cylinder pressure summation of the explosion stroke $P_{exp} = P_{exp} + P$ in Step S211. When the crank angle $\theta$ is not in the explosion stroke, since the crank angle $\theta$ is in the exhaust stroke, the operation calculates and memorizes the inner cylinder pressure summation of the exhaust stroke $P_{exh} = P_{exh} + P$ in Step S212.

When $\theta$ is not equal to $\theta_0$ in Step S203, the operation proceeds to Step S205. In Step S205, when $\theta = \theta_{359}$, the operation determines that the cylinder of the engine of the calculation target has rotated twice in crank angle, finishes the treatment of measuring and calculating the inner cylinder pressure, and in Step S213, the operation calculates and memorizes the indicated mean effective pressure $P_i$ based on the following equation (9).

$$P_i(j) = (P_{int} - P_{com} + P_{exp} - P_{exh})/n \qquad (9)$$

where $n = 180/2 = 90$, when the crank angle detecting resolution is 2° CA. In Step S214, the operation memorizes a difference $\Delta P_i(j)$ between the indicated mean effective pressure $P_i(j-1)$ at the preceding time $(j-1)$ and the current $P_i(j)$ as in the following equation (10).

$$\Delta P_i(j) = P_i(j) - P_i(j-1) \qquad (10)$$

The operation finishes the crank angle interruption routine after j is changed as $j = j+1$ in Step S215.

EXAMPLE 2

Figure 8:
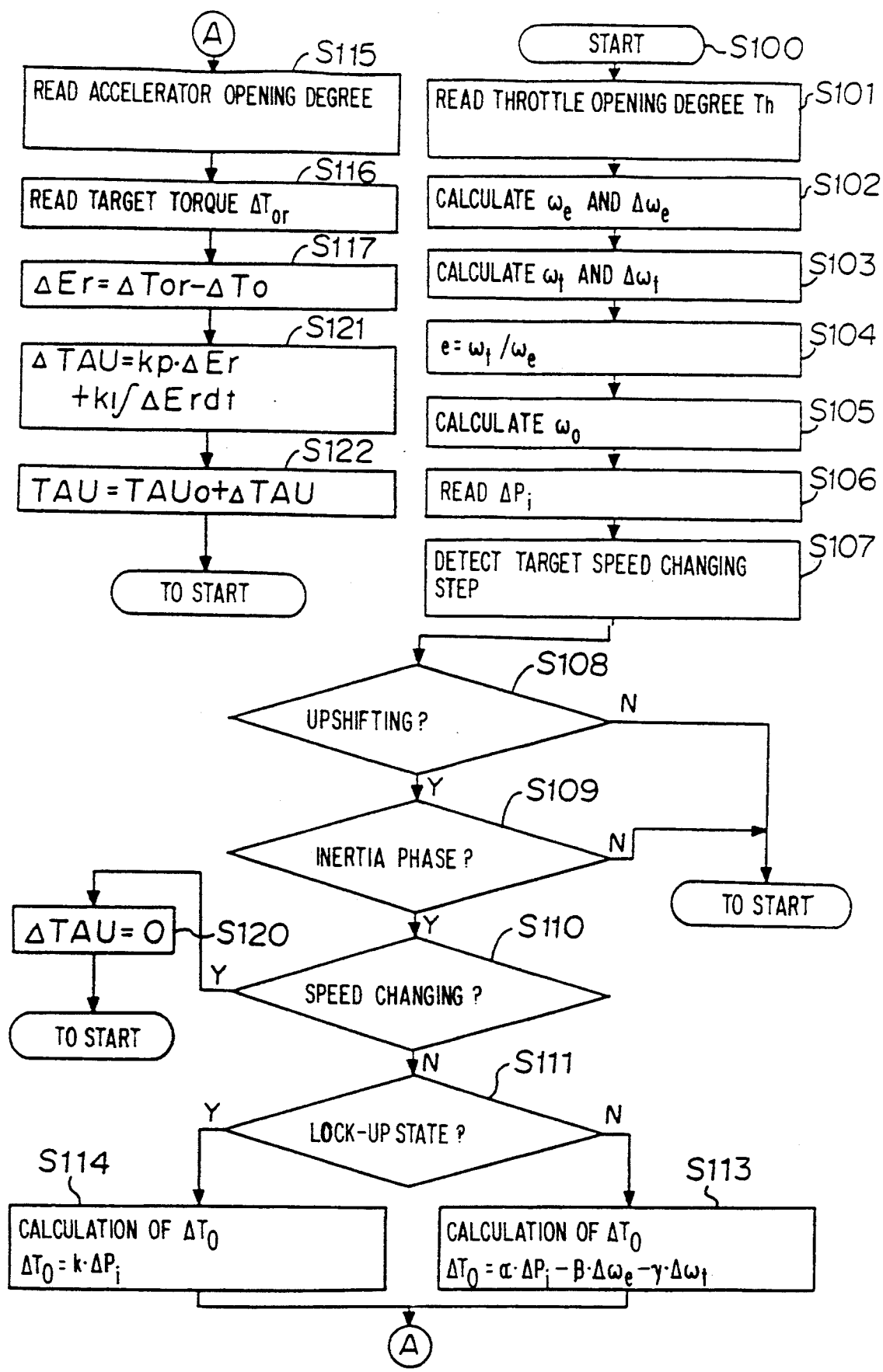
FIG. 8 is a main flowchart for explaining the operation of an embodiment 2 of this invention.

The explanation has been given to a case of performing the ignition timing correction in Example 1. Example 2 shows a case wherein a correction is performed for the fuel injection quantity TAU. FIG. 8 is a flowchart showing the operation. Steps S100 through S111 and S113 through S117 are the same as those in Example 1. In Step S120, the operation resets the fuel injection quantity correction value $\Delta TAU$ to zero, renews the target speed changing step and the gear ratio $i_r$ as the current speed changing step and the gear ratio $i_a$, memorizes these values in the RAM 75 and returns to START. In Step S121, the operation calculates and memorizes the fuel injection quantity correction value $\Delta TAU$ by the following equation (11).

$$\Delta TAU = k_p \Delta E_r + k_1 \int \Delta E_r dt \qquad (11)$$

In Step S122, the operation adds the fuel injection quantity correction value $\Delta TAU$ to the basic fuel injection quantity $TAU_0$, and finishes the main routine by calculating and memorizing the fuel injection quantity TAU. The effect is the same as in Example 1.

EXAMPLE 3

FIG. 9 is a flowchart showing the operation of Example 3, wherein Steps S100 through S111 and S113 through S117 are the same with those in Example 1. In Step 123, the operation resets the throttle opening degree correction value $\Delta T_h$ to zero, renews the target speed changing step and the gear ratio $i_r$ as the current speed changing step and the gear ratio $i_a$, and returns to START after memorizing the values in the RAM 75. In Step S124, the operation calculates and memorizes the throttle opening degree correction value $\Delta T_h$ by the following equation (12).

$$\Delta T_h = k_p \cdot \Delta E_r + k_1 \int \Delta E_r dt \qquad (12)$$

In Step S125, the operation adds the correction value $\Delta T_h$ to the basic throttle opening degree $T_{h0}$, and finishes the main routine by calculating and memorizing the throttle opening degree $T_h$. The effect is the same as in Example 1.

EXAMPLE 4

Figure 10:
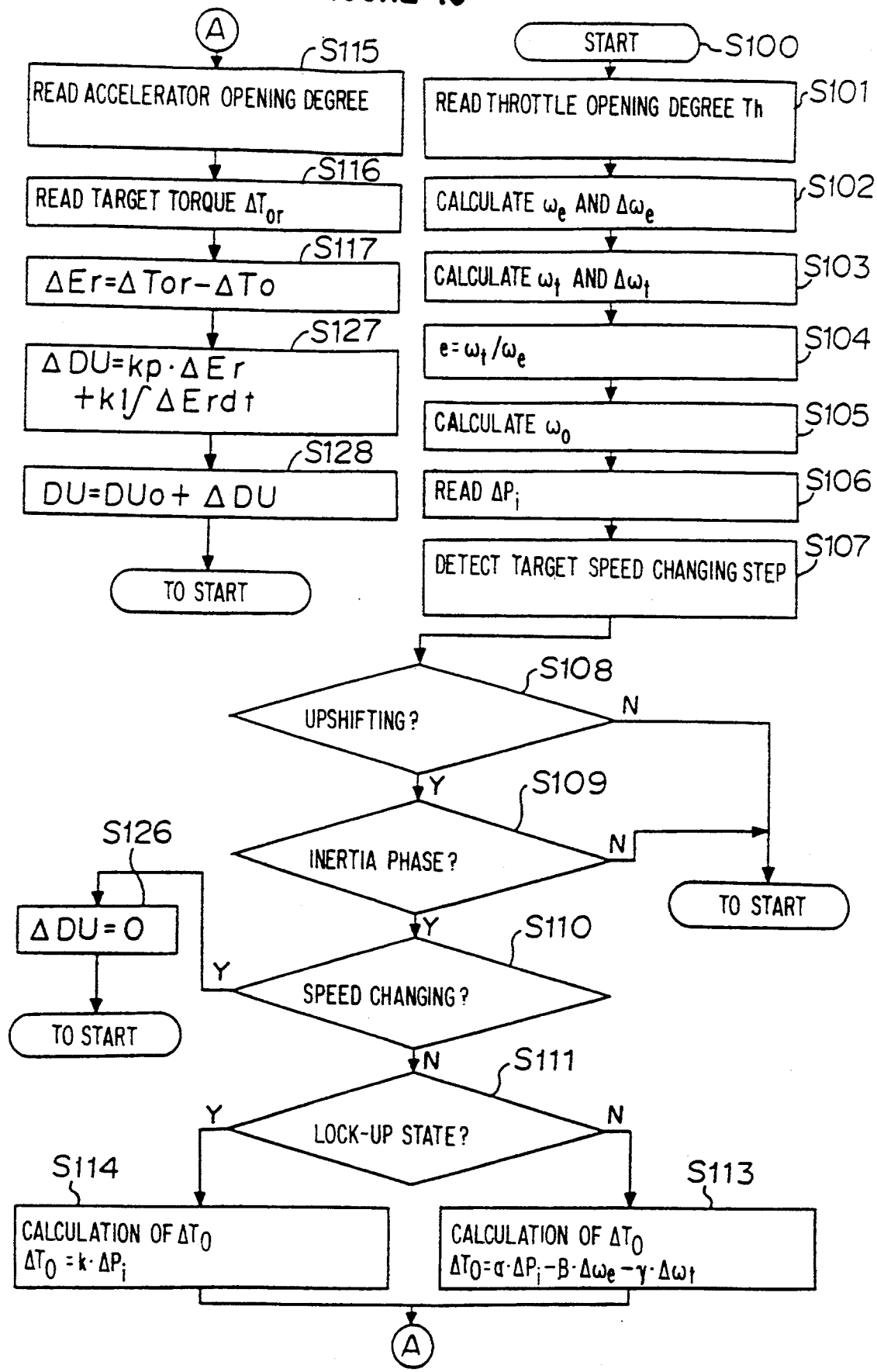
FIG. 10 is a main flowchart for explaining the operation of am embodiment 4 of this invention.

The explanation has been given to the case of controlling the output torque of the engine in Examples 1 through 3. In Example 4, explanation will be given of a case of controlling the hydraulic pressure controlling unit 5b of the automatic transmission 4. FIG. 10 shows the flowchart. Steps S100 through S111 and S113 through S117 are the same as those in the above Examples. In Step S127, the operation calculates and memorizes a duty correction value $\Delta DU$ by the following equation (13), based on the torque error $\Delta E_r$ provided by Step S117, as the hydraulic pressure control signal of the engaging clutch, for instance, that of the solenoid valve 56 for controlling the hydraulic pressure of the 2-4 brake B2 in case of the power-on 1-2 upshifting.

$$\Delta DU = k_p \cdot \Delta E_r + k_1 \int \Delta E_r dt \qquad (13)$$

In Step S128, the operation adds the duty correction value $\Delta DU$ to a basic duty value $DU_O$ in speed changing which is read from an engaging initial duty value table for the respective clutches and brakes which is predetermined in accordance with the engine load, in accordance with the throttle opening degree $T_h$ and the rotation speed $\omega_0$ of the output shaft of the automatic transmission, and returns to START of the main routine after calculating and memorizing the duty output value DU. Furthermore, when the speed changing is finished, in Step S110, the operation resets the correction value $\Delta DU$ to zero in Step S126 and returns to START of the main routine.

The duty value of DU is selected by the ECU 6 in accordance with the kind of speed changing. In case of the 1-2 upshifting, the 2-4 solenoid valve 56 is selected at the hydraulic pressure control unit 5b, a duty control signal of, for instance, a driving frequency of 50 Hz, is outputted from the ECU 6 as the hydraulic pressure control signal and the 2-4 brake B2 is controlled to engage.

In the above respective embodiment, the torque $T_0$ of the output shaft of the automatic transmission in speed changing is controlled to conform to the target torque $T_{or}$, based on the calculated results, by outputting at least one of the ignition timing SA, the fuel injection quantity TAU, the throttle opening degree $T_h$ and the hydraulic pressure controlling value DU as the operating quantity from the ECU 6.

EXAMPLE 5

Figure 11:
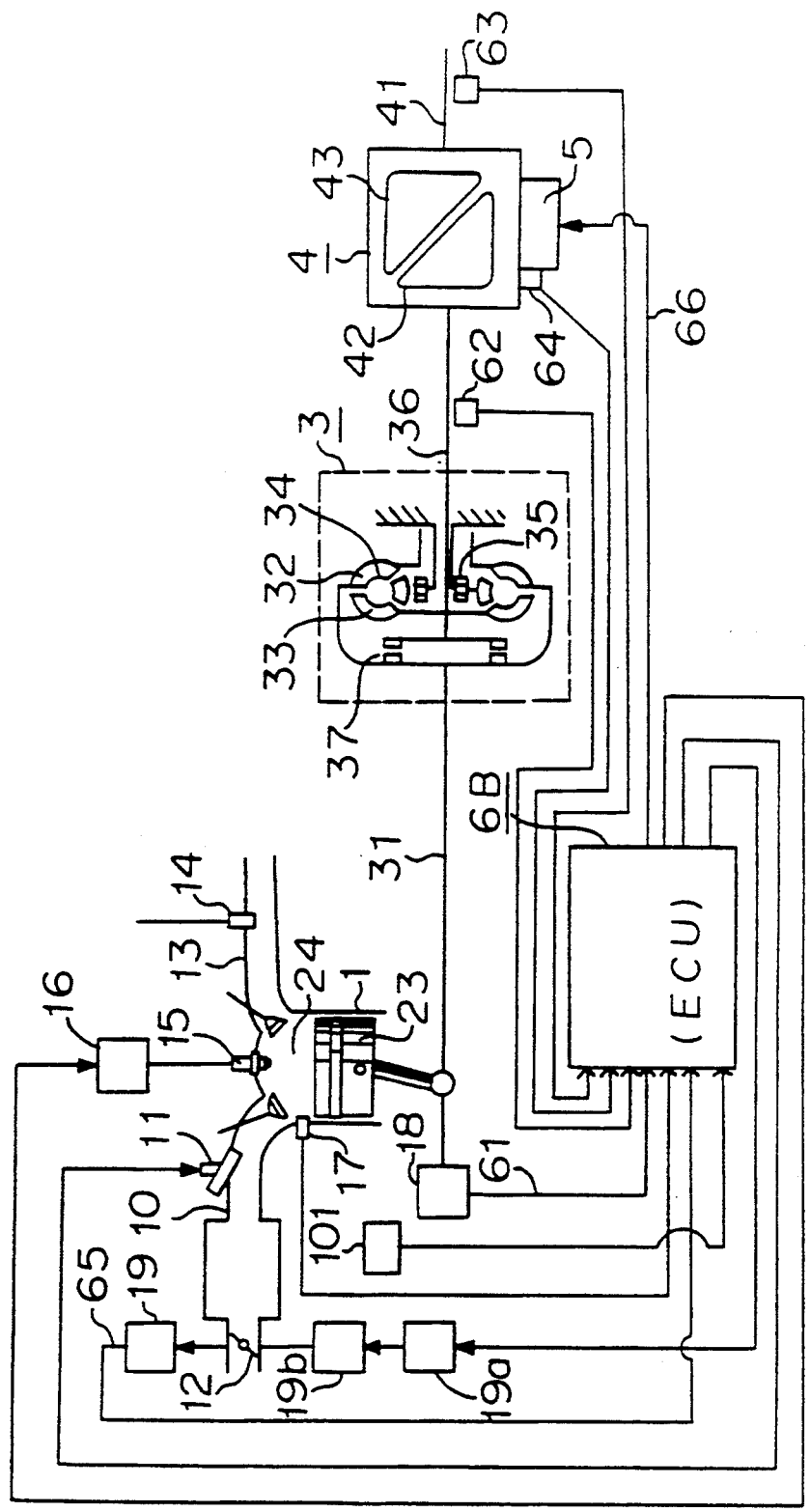
FIG. 11 is a block diagram showing the construction of an embodiment 5 of this invention of a control device for a vehicular engine having an automatic transmission.

FIG. 11 is a block diagram showing a total construction of a control device for a vehicular engine having an automatic transmission which is provided with a hydraulic pressure controlling device for controlling a line pressure of a working fluid to be supplied to the automatic transmission based on a torque of an input shaft of the automatic transmission. The construction of invention in Example 5 is the same with that of the embodiment 1 shown in FIG. 1, except that the calculation treatment or the data setting method of mainly a microprocessor in the control unit (hereinafter ECU) 6B, are different from those in embodiment 1.

The ECU 6B controls the servo driving circuit 19a, by which the servo motor 19b is driven to perform the opening degree control of the throttle valve 12. The opening degree of the throttle 12 is detected by the throttle opening degree sensor 19, and the throttle opening degree signal 65 is inputted to the ECU 6. The intake manifold 10 is attached with the injector 11, which injects fuel into the intake manifold 10 by the control of the ECU 6.

The torque converter 3 shown in FIG. 11 is provided with the pump impeller 32, the turbine liner 33, the stator 34 and the one-way clutch 35. The stator 34 is connected to a transmission case, not shown, through the one-way clutch 35, and rotates in the direction the same with that of the input shaft 31 (crankshaft of engine) of the torque converter, by the function of the one-way clutch 35. However, the rotation thereof in the reverse direction is not allowable.

Furthermore, the lock-up clutch 37 is provided between the input shaft 31 and the turbine liner 33 which is connected to the output shaft 36. This lock-up clutch 37 mainly operates in a steady-state running at the high speed stage (gear) and functions as a clutch for promoting the transmission efficiency by locking up the input shaft 31 and the output shaft 36 of the torque converter 3 at the high gear stage.

That it to say, the output of the engine 1 is transmitted to the turbine liner 33 through the lock-up clutch 37, or by rotating the inside working fluid by the pump impeller 32 and by increasing the torque by the working fluid under the counter-force by the stator 34. The torque transmitted to the turbine liner 33, is transmitted to the speed changing gear mechanism 43 arranged after the torque converter 3, through the output shaft 36 (also an input shaft of the automatic transmission) of the torque converter 3.

Furthermore, the rotation speed of the turbine liner 33 is detected by the turbine liner rotation sensor 62. The detected output is transmitted to the ECU 6B. Similarly, the rotation speed of the output shaft 41 of the automatic transmission is detected by the automatic transmission output shaft rotation sensor 63, which also is transmitted to the ECU 6B. A reference numeral 42 designates the hydraulic friction engaging elements of the automatic transmission 4, and 64, the shift position sensor, which detects the shift position of the automatic transmission 4 and of which detected output is transmitted to the ECU 6B. Furthermore, the ECU 6B transmits the valve controlling signal 66 to the hydraulic pressure controlling device 5.

Figure 13:
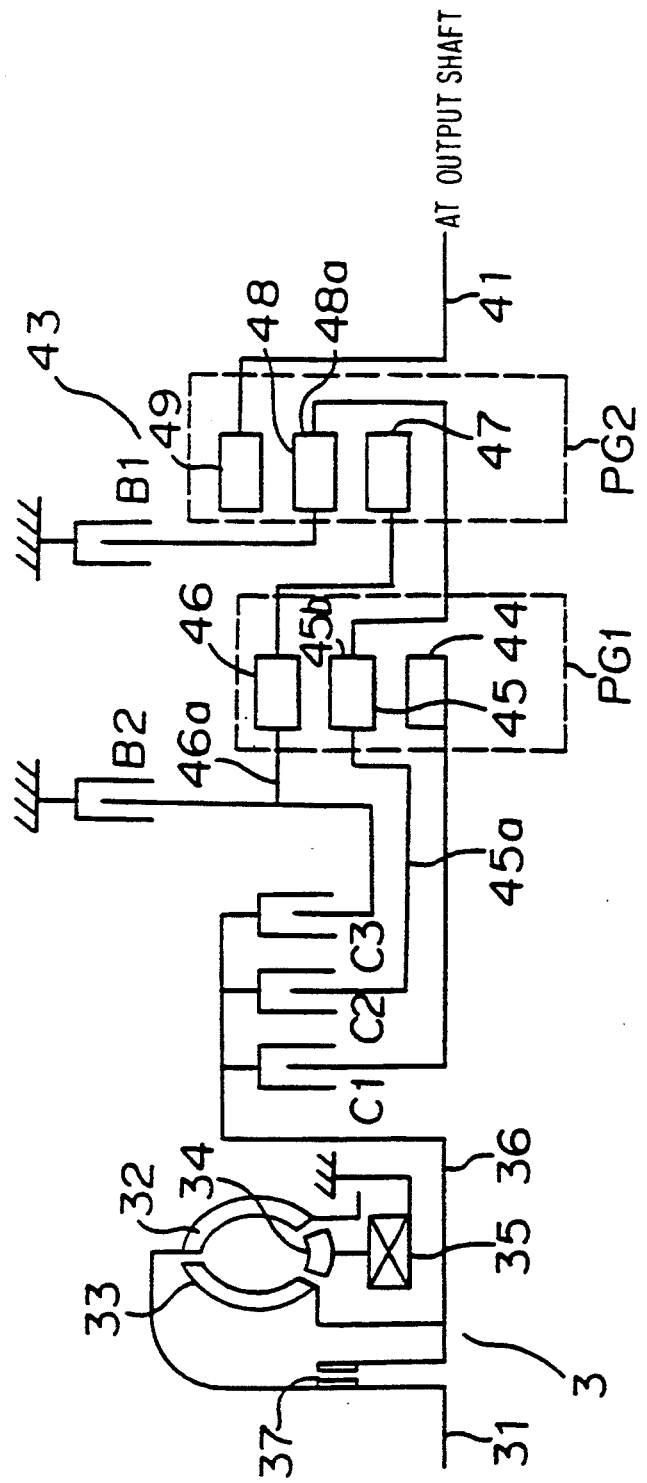
FIG. 13 is a construction diagram of a gear changing unit of the automatic transmission 4 in FIG. 11.

FIG. 13 is a skelton diagram of the gear speed changing device 43 capable of achieving the speed changing steps of four forward steps (gear ratio) and one reverse step. The output shaft 36 of the torque converter 3 is connected to the underdrive clutch C1 (hereinafter UD clutch C1), the overdrive clutch C2 (hereinafter OD clutch C2) and the reverse clutch C3 (hereinafter R clutch C3) as hydraulic friction engaging elements. The output side of the OD clutch C2 is connected to the first carrier 45 of the first simple planetary gear device PG1 (hereinafter, the first gear device PG1) through the first intermediate shaft 45a, to the second carrier 48 of the second simple planetary gear device PG2 (hereinafter, second gear device PG2), and to the low reverse brake B1 (hereinafter, L&R brake B1) as a hydraulic friction engaging element for stopping the rotation of the intermediate shaft 45a.

The output side of the UD clutch C1 is connected to the first sun gear 44 of the first gear device PG1. The output side of the R clutch C3 is connected to the first ring gear 46 of the first gear device PG1 through the second intermediate shaft 46a, to the second sun gear 47 of the second gear device PG2, and to the 2-4 brake B2 as the hydraulic friction engaging element for stopping the rotation of the second intermediate shaft 46a.

The first gear device PG1 is composed of the first sun gear 44, the first pinion gear 45b in mesh with the first sun gear 44, the first carrier 45 which rotatably supports the first pinion gear 45b and is rotatable per se, and the first ring gear 46 in mesh with the first pinion gear 45b.

Furthermore, the second gear device PG2 is composed of the second sun gear 47, the second pinion gear 48a in mesh with the second sun gear 47, the second carrier 48 which rotatably supports the second pinion gear 48a and is rotatable per se, and the second ring gear 49 in mesh with the second pinion gear 48a. The second ring gear 49 is connected to the output shaft 41 of the gear speed changing device 43.

The respective clutches and brakes are provided with piston devices or servo devices for engaging, not shown. The engaging and disengaging operations are performed by supplying and discharging the working fluid pressure. The working fluid pressure is selectively supplied to the respective clutches and brakes. By the operational combination of the respective clutches and brakes, the speed changing steps (gear) of four forward steps and one reverse step, are achieved.

The following Table 2 shows the operational state of the respective clutches and brakes. On the upper columns of the respective items of Table 1, "○" mark designates the engaging of clutch or brake, and "—" mark, the disengaging thereof.

TABLE 2

| Speed changing step | LR Brake | 2-4 brake | UD clutch | OD clutch | R clutch | AT output shaft torque $T_0$ |
|---|---|---|---|---|---|---|
| First speed | ○ $(i_1 - 1)T_t$ | — 0 | ○ $T_t$ | — 0 | — 0 | $i_1 T_t$ |
| Second speed | — 0 | ○ $(i_2 - 1)T_t$ | ○ $T_t$ | — 0 | — 0 | $i_2 T_t$ |
| Third speed | — 0 | — 0 | ○ $\frac{1}{i_1} T_t$ | ○ $\left(1 - \frac{1}{i_1}\right) T_t$ | — 0 | $i_3 T_t$ |
| Fourth speed | — 0 | ○ $\frac{i_2 - 1}{i_4 - 1} T_t$ | — 0 | ○ $T_t$ | — 0 | $i_4 T_t$ |
| Reverse | ○ $\frac{i_1 - 1}{i_2 - 1} T_t$ | — 0 | — 0 | — 0 | ○ $T_t$ | $i_R T_t$ |

Upper notation;
○: engaging
—: disengaging
Lower notations;
0: zero torque

The lower columns of the respective items in Table 2 show the allotted torque of clutch or brake with respect to the torque $T_t$ of the input shaft of the automatic transmission. "0" means that the torque is null. Notations $i_1$, $i_2$, $i_3$, $i_4$ and $i_R$ signify the gear ratios of the automatic transmission. The torque of the output shaft of the automatic transmission is described by a product of the torque of the input shaft multiplied by the gear ratio of the speed changing step.

Generally, the allotted torque T of the hydraulic wet clutch or brake is given by the following equation (14).

$$T = 2 \cdot n \cdot A \cdot r \cdot \mu \cdot (P - P_0) \tag{14}$$

where n is a sheet number of clutch, A, a pressure receiving area, r, an average radius, $\mu$, coefficient of friction, P, supplied working fluid pressure, and $P_0$ an equivalent offset pressure operated by a return spring, which are determined by the dimension, the shape and the like inherent to the respective clutch and brake. The working fluid pressure corresponding to the torque can be calculated based on equation (14).

In the above construction, when the LR brake B1 is engaged, the first carrier 45 and second carrier 48 are fixed and become counter-force elements. By engaging the UD clutch C1, the driving force from the torque converter 3 is transmitted to the input shaft 36, the UD clutch C1, the first sun gear 44, the first pinion gear 45b, the first ring gear 46, the second sun gear 47, the second pinion gear 48a, the second ring gear 49 and finally to the output shaft 41, which achieves the first speed (gear). As shown in Table 2, the allotted torque of the UD clutch C1 is equal to the torque $T_t$ of the input shaft of the automatic transmission. The allotted torque of the LR brake is $(i_1 - 1) \cdot T_t$. The similar relationship can be read from Table 2.

Next, when the LR brake B1 is disengaged and the 2-4 brake B2 is engaged, while maintaining the engaging state of the UD clutch C1, the rotations of the first ring gear 46 and the second sun gear 47 are stopped and the first ring gear 46 and the second sun gear 47 become counter-force elements. The driving force is transmitted to the first sun gear 44, the first carrier 45, the second carrier 48, the second ring gear 49 and finally to the output shaft 41, which achieves the second speed (gear).

Next, when the 2-4 brake B2 is disengaged and the OD clutch C2 is engaged, while maintaining the engaging state of the UC clutch C1, the total first gear device PG1 integrally rotates since the first sun gear 44 and the first carrier 45 rotate integrally. Accordingly, the total second gear device PG2 similarly rotates integrally, which achieves the third speed (gear) wherein the input shaft 36 and the output shaft 41 share the same rotation speed.

Next, when the UD clutch C1 is disengaged and the 2-4 brake B2 is engaged while maintaining the engaging state of the OD clutch C2, the rotation of the second sun gear 47 is stopped and the second sun gear 47 becomes the counter-force element. Therefore, the driving force is transmitted to the input shaft 36, the OD clutch C2, the first intermediate shaft 45a, the first carrier 45, the second carrier 48, the second pinion gear 48a, the second ring gear 49 and finally the output shaft 41, which achieves the overdriving fourth speed (gear) wherein the rotation of the output shaft 41 is faster than that of the input shaft 36.

Next, when the OD clutch C2 and the 2-4 brake B2 are disengaged and the LR brake B1 is engaged, the first carrier 45 and the second carrier 48 are fixed and the first carrier 45 and the second carrier 48 become the counter-force elements. Therefore, by engaging the R clutch C3, the driving force is transmitted to the second intermediate shaft 46a, the first ring gear 46, the second sun gear 47, the second pinion gear 48a, the second ring gear 49 and finally to the output shaft 41, which achieves the reverse speed changing step (gear).

Next, an explanation will be give of the construction and operation of the hydraulic controlling device 5 for achieving the respective speed changing steps shown in Table 2 and controlling a line pressure of the automatic transmission, in the gear speed changing device 43 shown in FIG. 13.

Figure 14:
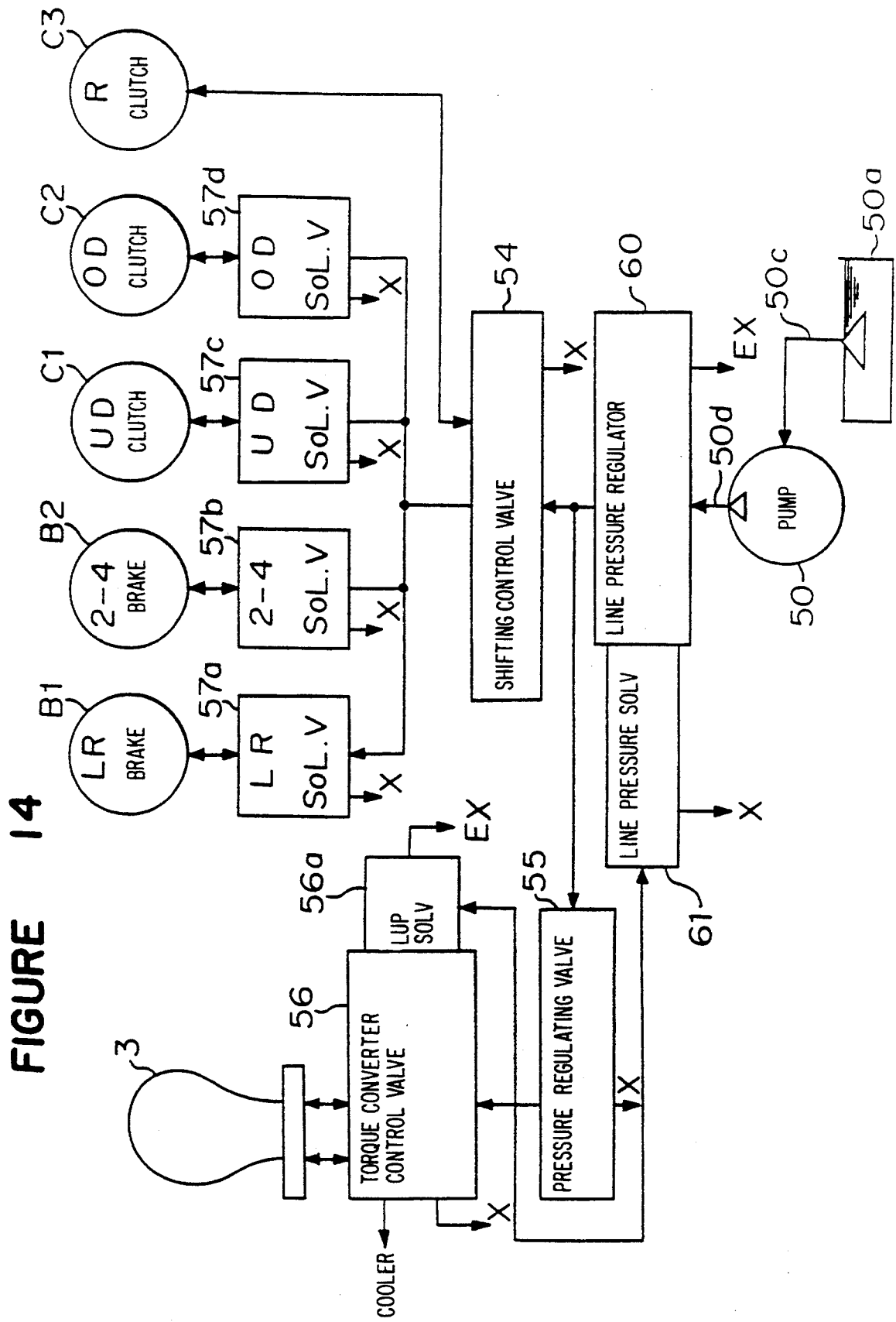
FIG. 14 is a construction diagram of a hydraulic pressure controlling unit of the automatic transmission 4 in FIG. 11.

FIG. 14 is a block diagram showing the hydraulic controlling device 5 of the automatic transmission 4. The oil pump 50 driven by the engine sucks the working fluid from an oil tank 50a through an oil filter 50b and through an oil absorbing passage 50c, and transmits the working fluid to a line pressure regulator 60 through a transmitting passage 50d. The working fluid pressure is controlled to the line pressure which is set by the control signal to the line pressure control valve 61 of the pressure regulating valve. "X" in FIG. 14 designates a discharge passage to atmospheric pressure, and "SOL, V", a solenoid valve.

The line pressure controlled by the line pressure regulator 57a is supplied to the shifting control valve 54 which operates directly by a shift lever (not shown), the oil passages are selectively switched in accordance with the shift lever position, and the hydraulic pressure supply is performed to the clutches and brakes which engage in the forward and the reverse movement, through the respective solenoid valves (except the R clutch C3).

On the other hand, the working fluid pressure is supplied to the torque converter control valve 56 through the pressure regulating valve 55 for the torque converter 3, which controls the working fluid pressure of the lock-up clutch 37 by controlling indirectly the torque converter control valve 56, thereby performing the engaging and disengaging operation of the lock-up clutch 37.

The construction and the operation of the solenoid valves 57a, 57b, 57c and 57d installed for the respective clutches and brakes, are already publicly-known in "An analysis on the characteristic of a duty-control solenoid valve for converting electricity to hydraulic pressure" Transaction of the Automobile Engineering Society 1988, Vol 42, No. 4, P. 517 through 523. The hydraulic pressure controlling is performed by duty-controlling the respective solenoid valves in engaging and disengaging the respective clutches and brakes. The line pressure controlling valve 61 to be mentioned later has the same construction.

The hydraulic pressure in switching the respective clutches and brakes in accordance with the transition from a certain speed changing step to another speed changing step, is controlled by employing the solenoid valves 57a through 57d. For instance, when the power-on upshifting from the first speed to the second speed is performed, the hydraulic pressure of the 2-4 brake B2 is increased by the solenoid valve 57b thereby engaging the 2-4 solenoid valve and at the same time, the hydraulic pressure of the LR brake B1 is decreased in accordance with the increase of hydraulic pressure of the 2-4 brake B1 by the solenoid valve 57a, thereby achieving the speed changing from "1" to "2".

Figure 17:
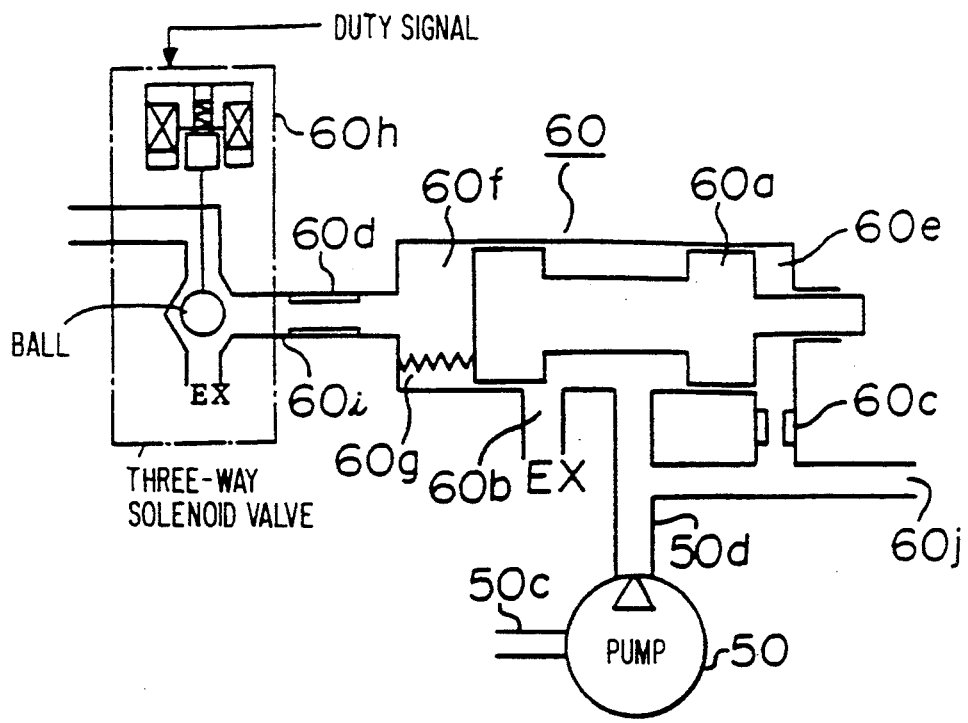
FIG. 17 is a diagram showing the construction of a line pressure regulator 60 in FIG. 14.

FIG. 17 shows the construction of the line pressure regulator 60, wherein the line pressure regulator 60 is composed of a spool valve 60a, a discharge orifice 60b, a feedback orifice 60c, a set orifice 60d, a feedback oil chamber 60e, a set pressure oil chamber 60f, a spool spring 60g, a passage 60i which connects a line pressure control valve 60h and the set orifice 60d, and a passage 60j which transmits the working fluid to the shifting control valve 54 and the pressure regulating valve 55.

Figure 18:
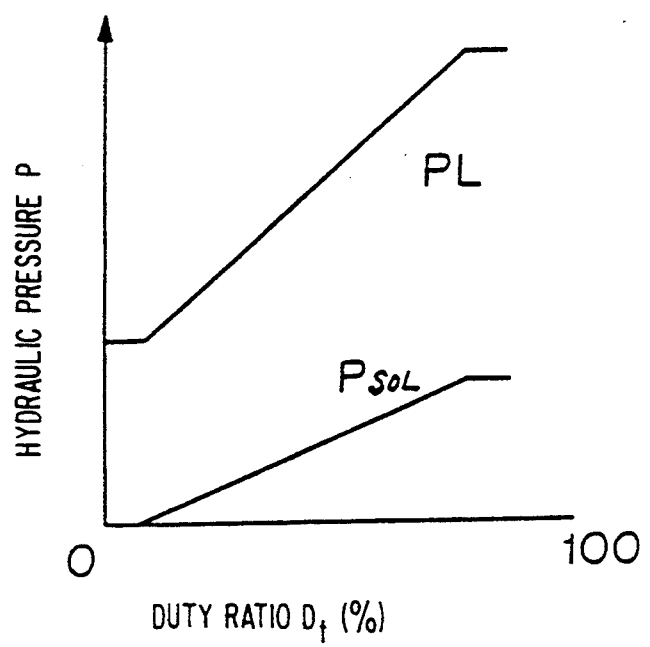
FIG. 18 is a characteristic diagram of a line pressure with respect to a control duty ratio of the line pressure regulator 60 in FIG. 14.

FIG. 18 illustrates a control characteristic of the line pressure regulator 60, which shows a relationship between an oil pressure $P_{SOL}$ of the set pressure oil chamber 60f and the pressure in the hydraulic pressure passage 60j (meaning the line pressure $P_L$) corresponding to the control duty ratio signal $D_t$ of the line pressure control valve 60h.

Figure 12:
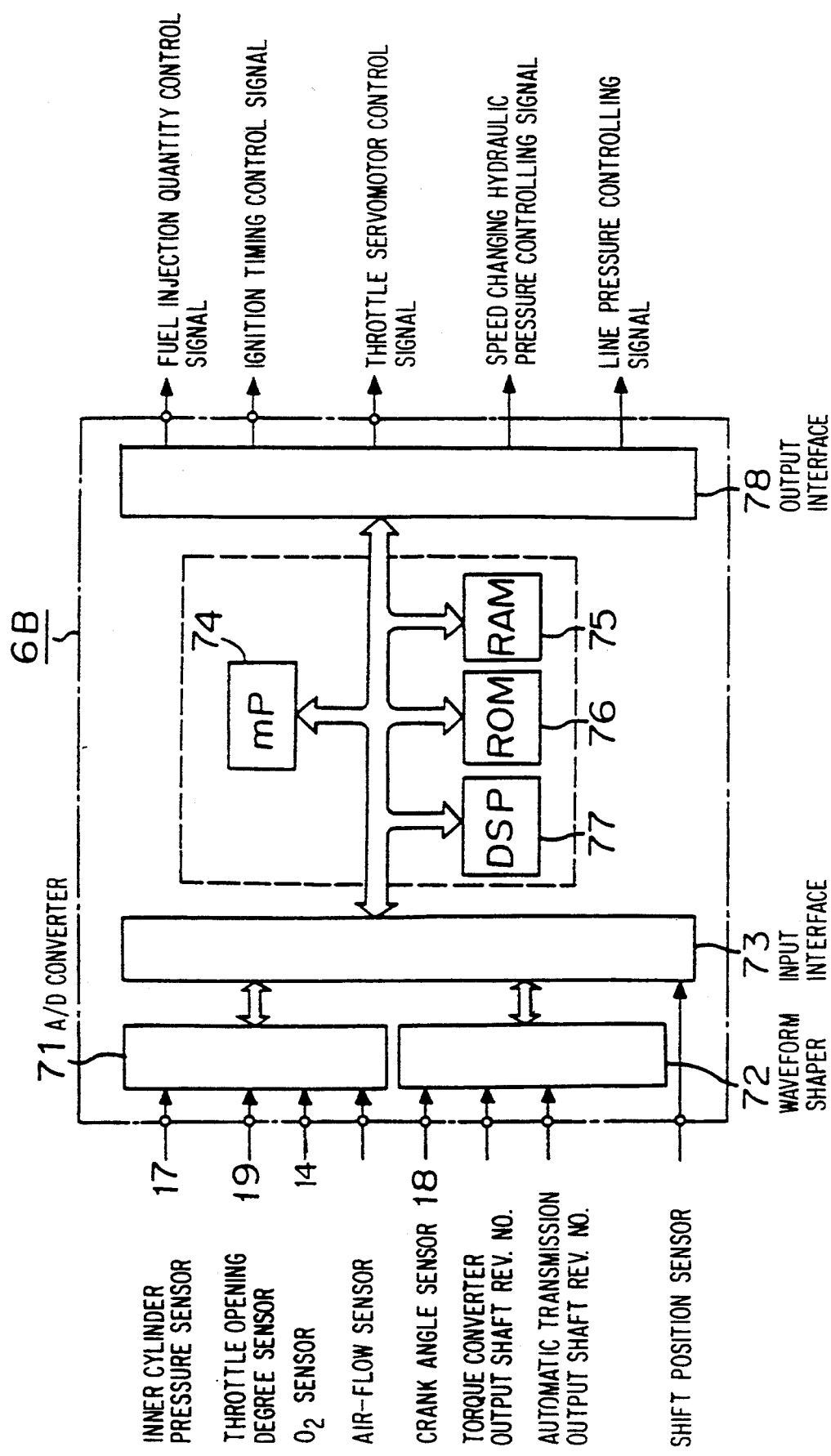
FIG. 12 is a block diagram showing the construction of an electronic control unit (ECU) in FIG. 11.

FIG. 12 shows the outline construction of the ECU 6B which is similar to the ECU 6A shown in FIG. 2. The control procedure and the data in the microprocessor 74 are previously memorized in the ROM 76. The data in the calculation procedure are temporarily stored in the RAM 75. The digital signal processor (hereinafter, DSP) 77 calculates the output signal of the inner cylinder pressure sensor at high speed in synchronism with the crank angle, and transmits the calculation results to the microprocessor 74 through the common bus.

Figure 15:
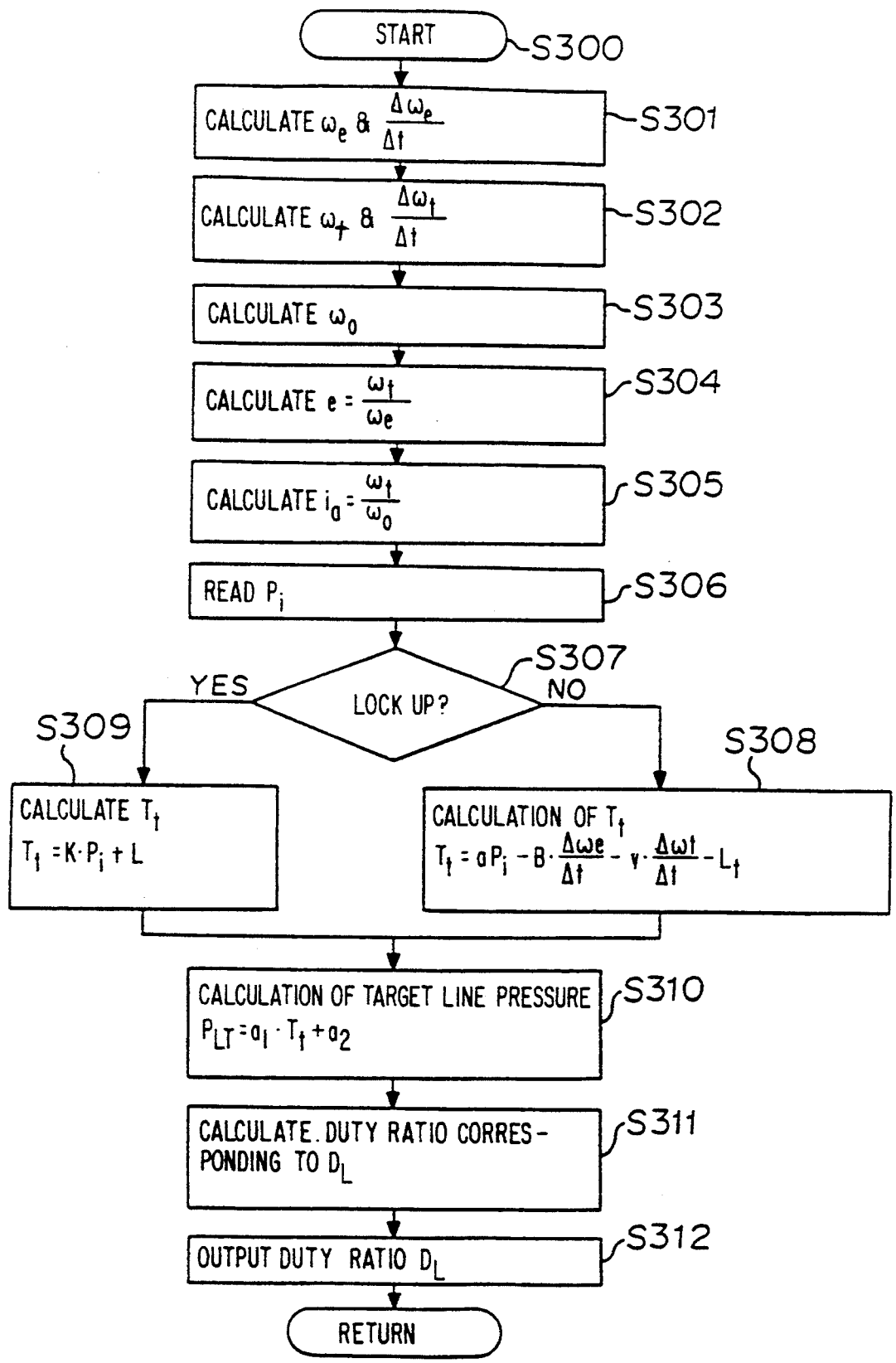
FIG. 15 is a main flowchart for explaining the operation of embodiment 5 of this invention.
Figure 16:
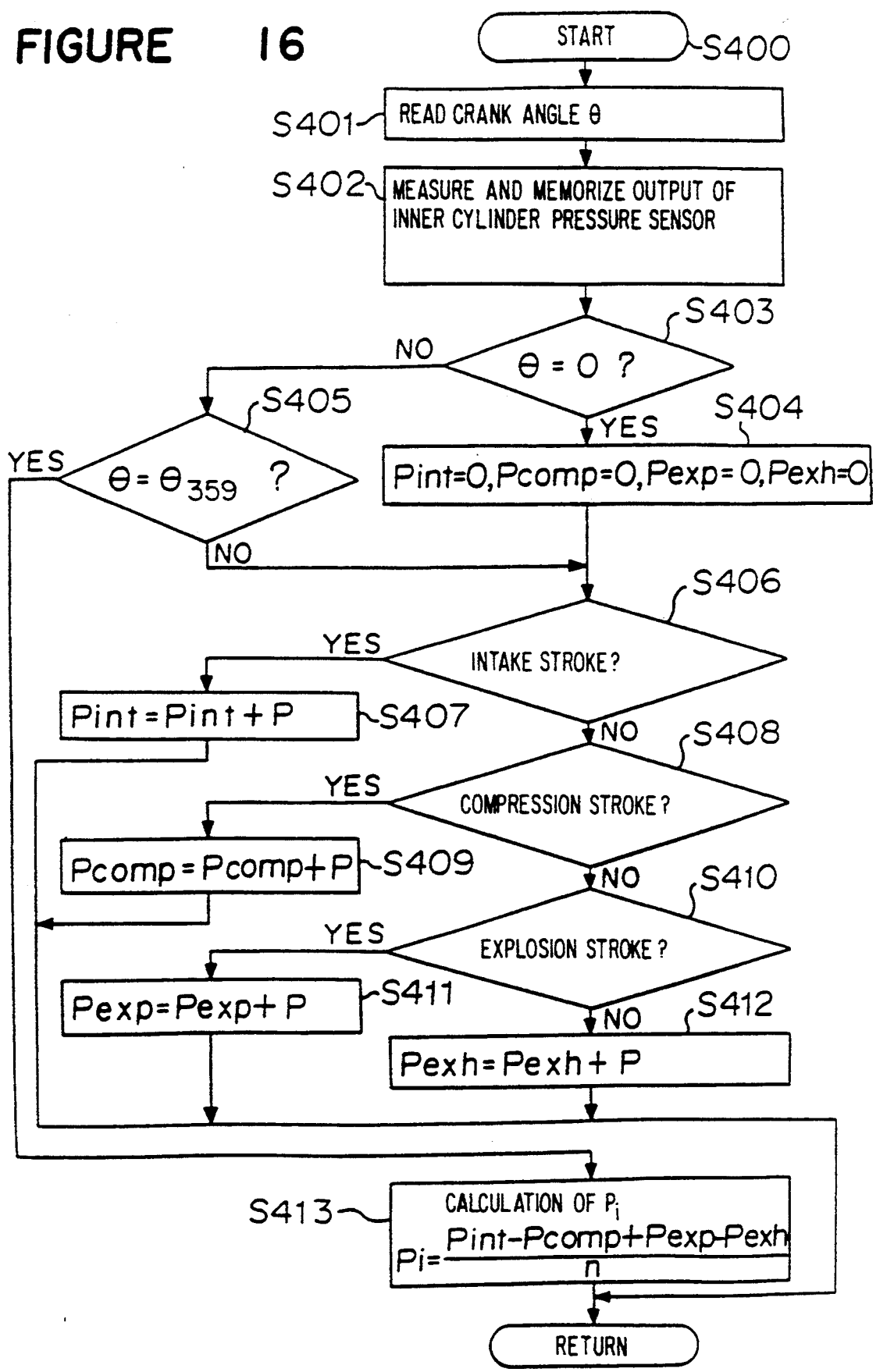
FIG. 16 is a flowchart for explaining the operation of embodiment 5 of this invention of a crank angle interruption routine.

Next, an explanation will be given of the calculation procedure of the ECU 6B in accordance with the flow-charts of FIGS. 15 and 16. FIG. 15 shows a main routine and FIG. 16, an interruption routine performed in synchronism with the crank angle. The program incorporated in the ROM 76 is constructed such that the main routine shown in FIG. 15 is treated by the microprocessor 74 in the ECU 6B and the interruption routine in synchronism with the crank angle of FIG. 16 is treated by the DSP 77 in the ECU 6B, and the calculation results are transmitted to the microprocessor 74 at predetermined timings.

In this embodiment, for simplicity, an explanation will be given to a case of a single cylinder. However, with respect to multi-cylinders, a treatment is added wherein the cylinders are recognized based on the output signals of the crank angle sensor 18, and a treatment similar to the case of the single cylinder, is performed for the respective cylinders.

An explanation will be given of the operation of the main routine based on the flowchart of FIG. 15. First, the operation starts the treatment of the main routine in Step S300. In Step S301, the operation calculates the rotation speed $\omega_e$ of the engine and its change ratio $\Delta\omega_e/\Delta t$ and memorizes them to the RAM 75.

Next, in Step S302, the operation calculates the rotation speed $\omega_t$ of the output shaft of the torque converter and its change ratio $\Delta\omega_t/\Delta t$ based on the pulse signal of the rotation of the turbine liner from the turbine rotation sensor 62 and memorizes them to the RAM 75.

In Step S303, the operation calculates the rotation speed $\omega_o$ of the output shaft of the automatic transmission based on rotation pulse signals from the automatic transmission output shaft rotation sensor 63, and memorizes it to the RAM 75.

In Step S304, the operation calculates the speed ratio $e = \omega_t/\omega_e$ of the rotation speed $\omega_e$ of the engine as compared to the rotation speed $\omega_t$ of the output shaft of the torque converter, and memorizes it to the RAM 75.

In Step S305, the operation determines the speed changing step in a speed changing control routine, not shown, calculates the gear ratio $i_a = \omega_t/\omega_o$ from the rotation speed $\omega_t$ of the output shaft of the torque converter and the rotation speed $\omega_o$ of the output shaft of the automatic transmission and memorizes it to the RAM 75.

In Step S306, the operation reads an indicated mean effective pressure $P_i$ of a calculation result of the DSP 77 which has been treated in Step S413 of the crank angle interrupting routine of FIG. 16, to be mentioned later, from a RAM, not shown, incorporated in the DSP 77 and memorizes it in the RAM 75 of the ECU 6B.

Next, in Step S307, the operation determines the operation of the control valve, not shown, of the lock-up control routine of the torque converter 3, and determines whether the torque converter 3 is in a lock-up state, from the rotation speed $\omega_e$ of the engine and the rotation speed $\omega_t$ of the output shaft of the torque converter. When the operation determines that the torque converter 3 is not in the lock-up state, the operation proceeds to Step S308.

In Step S308, first, the operation reads coefficients $\alpha$, $\beta$, $\gamma$ and $L_t$ predetermined in accordance with the rotation speed $\omega_e$ of engine and the torque converter speed ratio e from the ROM 76, and calculates and memorizes the torque $T_t$ of the input shaft of the automatic transmission, based on the following equation (15) employing the indicated mean effective pressure $P_i$, the change ratio $\Delta\omega_e/\Delta t$ of the rotation speed of engine and the change ratio $\Delta\omega_t/\Delta t$ of the rotation speed of the input shaft of the torque converter which are memorized in the RAM 75.

$$T_t = \alpha \cdot P_i - \beta \cdot \Delta\omega_e/\Delta t - \gamma \cdot \Delta\omega_t/\Delta t - L_t \quad (15)$$

On the other hand, when the operation determines that the torque converter is in the lock-up state in Step S307, the operation proceeds to S309, wherein similar to Step S308, the operation calculates and memorizes the torque $T_t$ of the input shaft of the automatic transmission by employing the following equation (16).

$$T_t = K \cdot P_i + L \quad (16)$$

where K and L are coefficients corresponding to mechanical connecting state of shafts and gears from the engine to the automatic transmission in the lock-up state, which is previously determined in accordance with the gear ratio $i_a$.

Next, in Step S310, the operation reads coefficients $a_1$ and $a_2$ previously determined in accordance with the gear ratio $i_a$ of the automatic transmission, and calculates and memorizes a target line pressure $P_{LT}$, based on the following equation (17), by employing the torque $T_t$ of the input shaft of the automatic transmission which has been memorized in the RAM 70.

$$P_{LT} = a_1 \cdot T_t + a_2 \quad (17)$$

For instance, in this embodiment, from Table 2, in case of the gear ratio of the first speed (gear ratio $i_a = i_1$, generally, $i_1 > 1$), the allotted torque for the LR brake is $T_{LR} = (i_1 - 1)T_t$ and that of the UD clutch, $T_{UD} = T_t$. At this occasion, when the necessary line pressures are determined to be $P_{LR}$ and $P_{UD}$ from equation (14), $T_{LR}$ and $T_{UD}$ are determined by the following equations (18) and (19).

$$T_{LR} = C_{LR} \cdot (P_{LR} - P_{LR0}) \quad (18)$$

$$T_{UD} = C_{UD} \cdot (P_{UD} - P_{UD0}) \quad (19)$$

where $C_{LR}$, $C_{UD}$, $P_{LR0}$ and $P_{UD0}$ are coefficients determined by the constructions of clutches and brakes.

Accordingly, $P_{LR}$ and $P_{UD}$ can be provided by the following equation (20) and (21).

$$P_{LR} = P_{LR0} + T_{LR}/C_{LR} \quad (20)$$

$$P_{UD} = P_{UD0} + T_{UD}/C_{UD} \quad (21)$$

When $P_{LR} > P_{UD}$, which is previously determined from the constructions of clutches and brakes, in case of the gear ratio of the first speed, the coefficients are determined as $a_1 = 1/C_{LR}$ and $a_2 = P_{LR0}$. Similarly, the coefficients $a_1$ and $a_2$ can previously be provided in accordance with the respective gear ratios.

In Step S311, the operation reads the control duty ratio $D_L$ of the line pressure controlling valve 60h which has previously been determined in accordance with the line pressure $P_L$ from the ROM 76, or calculates and memorizes the control duty ratio $D_L$ of the line pressure controlling valve 61, based on the target line pressure $P_L$ memorized in the RAM 75.

In Step S312, the operation outputs the duty ratio $D_L$ which has been calculated and memorized in Step S311, to a valve driving circuit, not shown, of the line pressure controlling valve 60h, and controls the line pressure $P_L$ such that the line pressure $P_L$ agrees with the target line pressure $P_{LT}$. After the above steps, the operation finishes the main routine.

Next, an explanation will be given of the operation of the crank angle interrupting routine based on FIG. 16. First, the operation starts the interruption routine in Step S400. In Step S401, the operation reads the crank angle $\theta$ from the output signal of the crank angle sensor 18.

Next, the operation proceeds to Step S402, wherein the operation measures and memorizes the pressure signal of the inner cylinder pressure sensor 17 as the inner cylinder pressure value $P(\theta)$ at the crank angle $\theta$. Next, the operation determines whether the crank angle $\theta$ is an intake TDC ($\theta_0$) in Step S403.

When the operation determines YES in Step S403, the operation proceeds to Step S404, wherein the operation resets the inner cylinder pressure summations of the respective strokes of intake, compression, explosion and exhaust as $P_{int}=0$, $P_{comp}=0$, $P_{exp}=0$, $P_{exh}=0$.

Next, the operation proceeds to Step S406, and determines whether the crank angle $\theta$ is $0 \leq \theta < 180$ wherein the intake TDC is determined to be 0° CA. When the operation determines YES in Step S406, the operation proceeds to Step S407, calculates the inner cylinder pressure summation in the intake stroke as $P_{int}=P_{int}+P$ and memorizes it in the RAM 75.

Similarly, the operation determines whether the crank angle $\theta$ is in the compression stroke or the explosure stroke in Steps S408 and S410. When the crank angel $\theta$ is in the compression stroke as the result of determination in Step S408, the operation calculates the inner cylinder pressure summation in the compression stroke as $P_{com}=P_{com}+P$ in Step S409 and memorizes it to the RAM 75. When the crank angle $\theta$ is in the explosion stroke as the result of determination in Step S410, the operation calculates and memorizes the inner cylinder pressure summation in the explosion stroke as $P_{exp}=P_{exp}+P$ in Step S411.

When the crank angle $\theta$ is not in the compression stroke in Step S408, the operation proceeds to Step S410. When the crank angle $\theta$ is not in the explosion stroke in Step S410, the operation proceeds to S412, calculates the inner cylinder pressure summation in the exhaust stroke as $P_{exh}=P_{exh}+P$ memorizes it to the RAM 75 and finishes the interruption routine.

When the operation determines NO in Step S403, and determines that $\theta = \theta_{359}$ in Step S405, the operation determines that the cylinder of engine which is a target of calculation has rotated twice in crank angle, finishes the treatments of measuring and calculating the inner cylinder pressure, proceeds to Step S413, calculates the indicated mean effective pressure $P_i$ based on the following equation (8) and memorizes it to the RAM 75.

$$P_i = (P_{int} - P_{comp} + P_{exp} - P_{exh})/n \qquad (22)$$

where $n=180/2=90$ when the crank angle detecting resolution is 2° AC. After the above steps, the operation finishes the interruption routine.

The operation reads the indicated mean effective pressure $P_i$ which has been calculated and memorized in the interruption routine, in Step S306 in the main routine of FIG. 15, predicts the torque $T_t$ of the input shaft of the automatic transmission, calculates the target line pressure $P_{LT}$ and controls the line pressure $P_L$ by the hydraulic pressure controlling device 5 such that the line pressure $P_L$ agrees with the target line pressure $P_{LT}$.

Furthermore, in the embodiment 1, the oil pump 50 is driven by the engine 1. However, the same effect can be provided when the oil pump 50 is a so-called variable capacity pump wherein the flow quantity of the working fluid transmitted by the pump is made variable. Furthermore, the same effect can be provided when the oil pump 50 is for instance, a motor-driven pump which is driven irrespective of the engine 1.

Furthermore, in this embodiment, the duty-ratio $D_t$ is utilized in the output to the line pressure controlling valve 60h. However, the same effect can be provided when a hydraulic pressure sensor for detecting the line pressure is provided, which directly detects the current line pressure $P_L$ thereby controlling the line pressure $P_L$ to agree with the target line pressure $P_{LT}$.

According to the first aspect of the present invention, the control device for a vehicular engine having an automatic transmission is comprising an inner cylinder pressure sensor for detecting a pressure in a combustion chamber of an engine, means for detecting an output of the inner cylinder pressure sensor at a predetermined crank angle, means for calculating an output torque of the engine based on the detected value, means for detecting a rotation speed of an engine, means for detecting a rotation speed of an output shaft a torque converter, means for calculating a speed ratio of the rotation speed of the output shaft of the torque converter as compared to the rotation speed of the engine, means for calculating a torque of an output shaft of an automatic transmission based on the output torque of the engine, the rotation speed of the engine, the rotation speed of the output shaft of the torque converter and the speed ratio, and control means for controlling at least one of the output torque of the engine and a hydraulic pressure of the automatic transmission such that the torque of the output shaft of the automatic transmission conforms to a target torque. Therefore, the invention provides an effect wherein the control accuracy of the torque of the output shaft of the automatic transmission in speed changing, can be promoted.

According to the second aspect of the present invention, the control device for a vehicular engine having an automatic transmission is comprising an inner cylinder pressure sensor for detecting a pressure in a combustion chamber of an engine, means for setting a line pressure of a working fluid for supplying to an automatic transmission, means for detecting a rotation speed of the engine, means for calculating an output torque of the engine based on a detected value provided by detecting an output of the inner cylinder pressure at a predetermined angle, calculating a speed ratio of a rotation speed of a torque converter as compared to the rotation speed of the engine and for predicting a torque of an input shaft of the automatic transmission by calculating the torque of the input shaft of the automatic transmission based on the output torque of the engine, the rotation speed of the engine, the rotation speed of the output shaft of the torque converter and the speed ratio and the hydraulic pressure controlling means for controlling the line pressure of the working fluid for supplying to the automatic transmission based on the torque of the input shaft of the automatic transmission predicted by the torque calculating and predicting means. Accordingly, the torque of the input shaft of the automatic transmission is calculated based on the output torque of the engine which has been calculated based on the inner cylinder pressure sensor, the rotation speed of engine and the rotation speed of the output shaft of the torque converter. The line pressure of the working fluid to be supplied to the automatic transmission is controlled based on the calculated torque. Accordingly, the invention provides an effect wherein the deterioration of the fuel cost of the engine due to the excessive pump work can be prevented.

According to the third aspect of the present invention, the control method for a vehicular engine having an automatic transmission is comprising the steps of detecting a pressure in a combustion chamber of an engine by an inner cylinder pressure sensor, calculating an output torque of the engine based on a detected value provided by detecting the pressure in the combustion chamber at a predetermined crank angle, setting a line pressure of a working fluid for supplying to an automatic transmission, detecting a rotation speed of the engine, calculating a speed ratio of a rotation speed of an output shaft of a torque converter as compared to the rotation speed of the engine, detecting a speed ratio of the automatic transmission, predicting a torque of an input shaft of the automatic transmission by calculating the torque of the input shaft of the automatic transmission based on the output torque of the engine, the rotation speed of the engine, the rotation speed of the output shaft of the torque converter and the speed changing ratio, and controlling the line pressure of the working fluid for supplying to the automatic transmission by calculating a target line pressure based on the predicted torque of the input shaft of the automatic transmission. Therefore, the operation calculates the output of the engine based on the inner cylinder pressure detected by the inner cylinder pressure sensor, predicts the torque of the input shaft of the automatic transmission from the engine torque, the engine revolution speed and the torque converter output shaft revolution speed, by which the line pressure of the working fluid supplied to the automatic transmission is controlled. Therefore, this invention provides an effect wherein the power loss of the engine with regard to the working fluid to be supplied to the automatic transmission can always be maintained at minimum irrespective of the aging of the engine or the like.

What is claimed is:

1. A control device for a vehicular engine having an automatic transmission comprising:

an inner cylinder pressure sensor for detecting a pressure in a combustion chamber of an engine;

means for detecting an output of the inner cylinder pressure sensor at a predetermined crank angle;

means for calculating an output torque of the engine based on the detected output of the inner cylinder pressure sensor;

means for detecting a rotation speed of the engine;

means for detecting a rotation speed of an output shaft of a torque convertor;

means for calculating a speed ratio of the rotation speed of the output shaft of the torque converter as compared to the rotation speed of the engine;

means for calculating a torque of an output shaft of an automatic transmission based on the output torque of the engine, the rotation speed of the engine, the rotation speed of the output shaft of the torque converter and the speed ratio; and control means for controlling at least one of the output torque of the engine and a hydraulic pressure of the automatic transmission such that the torque of the output shaft of the automatic transmission conforms to a target torque.

* * * * *